United States Patent
Kirshner et al.

(10) Patent No.: US 9,690,105 B2
(45) Date of Patent: Jun. 27, 2017

(54) CALIBRATABLE BEAM SHAPING SYSTEM AND METHOD

(71) Applicant: Applied Materials Israel, Ltd., Rehovot (IL)

(72) Inventors: Binyamin Kirshner, Elkana (IL); Haim Eder, Kiryat Ono (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 15/046,377

(22) Filed: Feb. 17, 2016

(65) Prior Publication Data
US 2016/0161750 A1    Jun. 9, 2016

Related U.S. Application Data

(63) Continuation of application No. 13/849,187, filed on Mar. 22, 2013, now Pat. No. 9,291,825.

(51) Int. Cl.
*G06K 7/10* (2006.01)
*G02B 27/09* (2006.01)
(Continued)

(52) U.S. Cl.
CPC ........ *G02B 27/0927* (2013.01); *G01J 1/4257* (2013.01); *G02B 27/0025* (2013.01);
(Continued)

(58) Field of Classification Search
CPC ........ G01J 1/4257; G02F 1/01; G02F 1/0102; G02F 1/0105; G02B 7/003; G02B 7/004;
(Continued)

(56) References Cited

U.S. PATENT DOCUMENTS 3,476,463 A    11/1969    Kreuzen
4,911,711 A *   3/1990    Telfair ................ A61F 9/00804
                                               219/121.6
(Continued)

FOREIGN PATENT DOCUMENTS

CN    101506739 B    3/2013
JP    7301724    11/1995
(Continued)

OTHER PUBLICATIONS

U.S. Appl. No. 13/849,187 , "Notice of Allowance", Nov. 16, 2015, 13 pages.
(Continued)

*Primary Examiner* — Arnel C Lavarias
(74) *Attorney, Agent, or Firm* — Kilpatrick Townsend & Stockton LLP

(57) ABSTRACT

A beam shaping system including: a first and second optical modules that are accommodated in a spaced-apart relationship in an optical path of light through the system to sequentially apply beam shaping to light incident thereon. The beam shaping system includes first and second alignment modules respectively carrying the first and second optical modules and operable for laterally positioning the optical modules with respect to the optical path. A calibration module of the beam shaping system is connectable to the first and second alignment modules and is operable to sequentially calibrate and align the respective lateral positions of the first and second optical modules with respect to the optical path. The system thereby enables shaping of an incoming light beam of given predetermined wave-front and lateral intensity distribution to form an output light beam having desired wave-front and desired lateral intensity distribution.

20 Claims, 12 Drawing Sheets

(51) Int. Cl.
*G01J 1/42* (2006.01)
*G02B 27/00* (2006.01)
*G06T 7/00* (2017.01)
*G06T 7/32* (2017.01)
*G02B 7/00* (2006.01)

(52) U.S. Cl.
CPC ............... *G06T 7/001* (2013.01); *G06T 7/32* (2017.01); *G02B 7/003* (2013.01)

(58) Field of Classification Search
CPC ........ G02B 7/005; G02B 26/00; G02B 26/02; G02B 26/06; G02B 27/00; G02B 27/0025; G02B 27/0075; G02B 27/0081; G02B 27/09; G02B 27/0911; G02B 27/27; G02B 27/0916; G02B 27/0927; G02B 27/0938; G02B 27/0944; G02B 27/095; G02B 27/0955; G02B 27/62; H01S 3/005
USPC ........ 359/350, 355, 357, 362, 363; 356/121, 356/51
See application file for complete search history.

(56) References Cited

U.S. PATENT DOCUMENTS

| | | | |
|---|---|---|---|
| 5,796,112 | A | 8/1998 | Ichie |
| 7,773,315 | B2 | 8/2010 | Fuse |
| 9,291,825 | B2 * | 3/2016 | Kirshner ............ G02B 27/0927 |
| 2005/0128540 | A1 | 6/2005 | Kathman et al. |
| 2008/0212185 | A1 | 9/2008 | Fuse |
| 2014/0285877 | A1 | 9/2014 | Kirshner et al. |
| 2015/0036216 | A1 | 2/2015 | Schild |

FOREIGN PATENT DOCUMENTS

| | | |
|---|---|---|
| KR | 2007-0018805 A | 2/2007 |
| TW | 482705 | 4/2002 |
| TW | 2004-26391 A | 12/2004 |
| TW | 2005-01132 A | 1/2005 |
| TW | 2012-28762 A | 7/2012 |

OTHER PUBLICATIONS

Search Report for Taiwan Patent Application No. 102123029 issued Jul. 29, 2016, all pages.

* cited by examiner

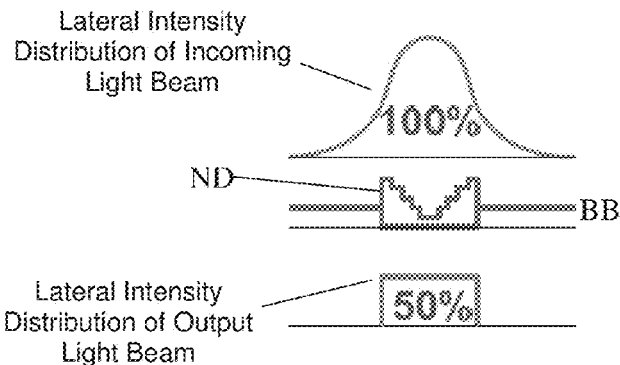

Fig. 1
General Art

200
Method for shaping intensity distribution and wave front of a light beam

| 210 | Providing a beam shaping system including an *intensity-redistribution and phase-corrector optical modules* arrange along an optical path and optionally also including a *beam expander module* upstream from the optical modules. |

| 220 | Mounting each of the *intensity-redistribution optical and phase-corrector modules* for adjustable lateral movement. |

| 230 | Providing a *calibration module* configured for: determining desired lateral alignments of the *intensity-redistribution* and *phase-corrector optical modules*, and optionally determining a desired beam expansion (zoom) by the *beam expander*. |

| 240 | Calibrating the intensity distribution and wave front of an output light beam by sequentially operating the *beam-expander-*, *intensity-distribution* and *wave-front* - calibration modules. |

Fig. 2

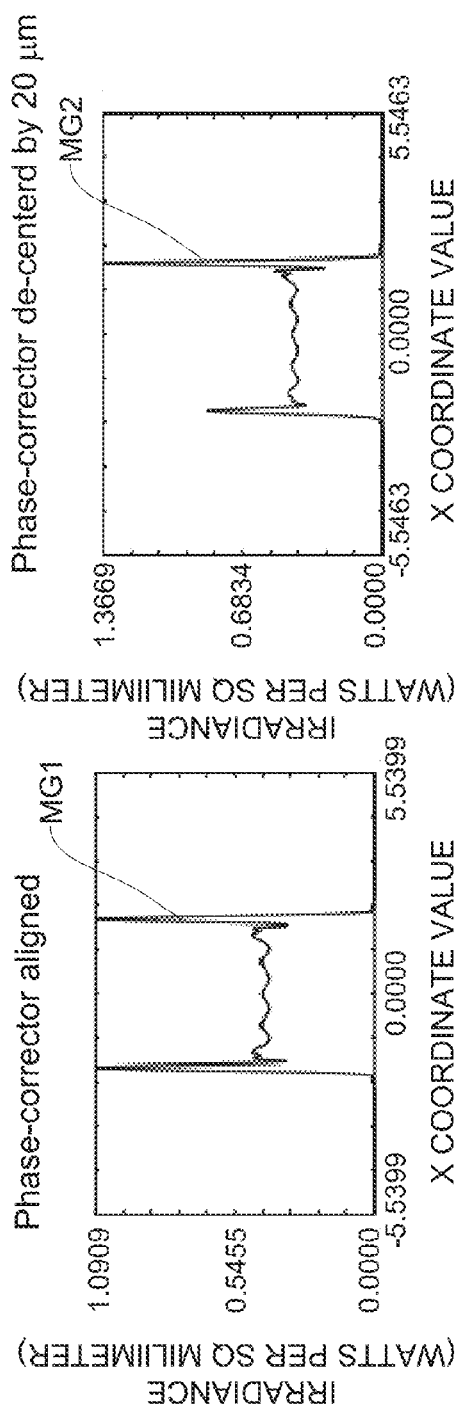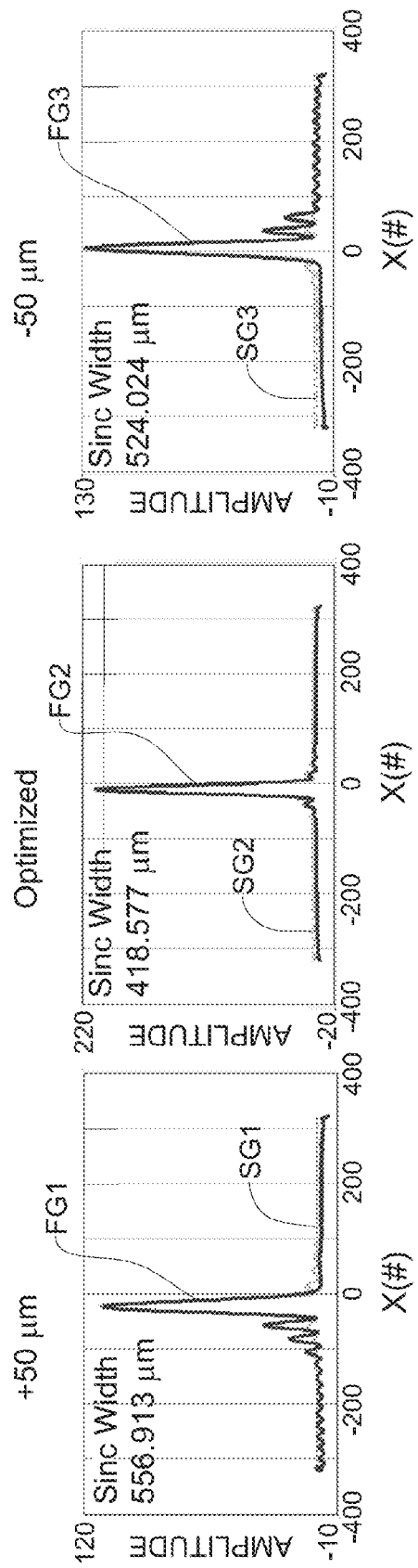

CALIBRATABLE BEAM SHAPING SYSTEM AND METHOD

CROSS-REFERENCE TO RELATED APPLICATIONS

This application is a continuation of U.S. application Ser. No. 13/849,187, filed Mar. 22, 2013, the entire contents of which are incorporated by reference herein for all purposes.

FIELD OF THE INVENTION

This invention relates to techniques for shaping coherent light beams. More specifically, the invention provides calibratable beam shaping system and a method for calibrating the same, and is aimed at shaping with high precision the intensity distribution and the wave-front of light beams having short wavelengths.

BACKGROUND OF THE INVENTION

There are various beam shaping techniques in the art which are used for shaping the profile of light beams (such as laser light beams) of different wavelength ranges. Techniques, based on refractive and/or diffractive beam shaping components, utilizes dual-/multi-element coherent beam shaper that includes two optical elements manipulating the intensity distribution and the phase of a coherent light beam.

The principles of the refractive beam shaping technique are described for example in U.S. Pat. No. 3,476,463 to Kreuzer et al. According to this technique rays of an input beam of coherent light are redistributed to yield an output beam of different predetermined intensity distribution. The optical path lengths of the rays are maintained constant between an equiphase surface of the input beam and a desired equiphase surface of the output beam having the predetermined intensity distribution. At least two active surfaces, usually aspherical, are employed. Design equations are given for a two-element system which converts a collimated input beam of Gaussian distribution into a collimated output beam of uniform distribution.

Other techniques, referred to herein as attenuating beam shaping techniques utilize an optical filter to differently attenuate light rays of the light beam to be shaped and thereby accomplish the beam shaping. Typically, in such beam shaping techniques, specifically designed spatially inhomogeneous neutral density (ND) optical filter(s) is used to attenuate and shape the intensity distribution of light beams (i.e. the one or two dimensional lateral intensity profile of the light). The spatial distribution of the filtration properties in the filter are designed in accordance with the lateral intensity distribution of the incoming light beam and the desired lateral intensity distribution to be obtained in the output.

FIG. 1, is illustrating schematically the operation of a known in the art attenuating beam shaping system typically used in shaping beams of deep-ultraviolet light. This system utilizing specifically designed ND filter ND together with an appropriate beam blocker BB (e.g. aperture) element. The ND filter and the blocker are designed for generating uneven attenuation to the intensity of an incoming light beam having a Gaussian lateral intensity distribution, for forming an output light beam having flat (top-hat) intensity distribution over the width of the output light beam. Here, the neutral density optical filter is designed to provide higher attenuation (lower transmission) for light intensity near the center of the light beam and higher transmission closer to the edge of the light beam (the edges themselves are delimitated by the mechanical aperture).

GENERAL DESCRIPTION OF THE INVENTION

There is a need in the art for a novel beam shaping technique that is capable of shaping the intensity distribution and the wave-front of coherent light beams with high precision and minimal losses. Specifically, there is a need in the art for a beam shaping technique that is suited for use with light of short wavelengths, such as in the Ultra-Violet (UV) and Deep UV regimes, and which can be calibrated to operate accurately under variable conditions (e.g. varying temperature, beam width etc.).

Refractive and diffractive beam shaping techniques are in general very efficient, capable of shaping a light beam without significantly reducing its total intensity (e.g. providing transmission in the order of 75 to 95 percent). These techniques utilize an optical arrangement of two optical modules/elements, a first one being an intensity redistribution module affecting the intensity profile of the light beam and the second one being phase correction module affecting the wave front of the light beam. The optical modules may be refractive and/or diffractive modules. For clarity, both the refractive and diffractive beam shaping techniques are referred to herein as intensity and phase beam shaping.

However, intensity and phase beam shaping techniques are generally very susceptible to precise alignment of the optical elements to the optical axis defined by the symmetry axis of the incident beam profile. Accordingly, such techniques are susceptible to variations in the operating conditions of the beam shaping apparatus and/or these of the light source. Such variations may result in geometrical mismatches between the optical elements themselves and/or between the optical elements and the beam, and may thereby significantly affect the shape and wave front error of the output beam.

In view of the above, in many cases attenuation based techniques are used to shape light beams especially where accurate and robust beam shaping results are required. However, as can be seen from FIG. 1, attenuating beam shaping techniques, are typically associated with low energetic efficiency. Typical energetic efficiency of such techniques are in the order of 50% and even below depending on the intensity profile/distribution of the incoming beam and the desired intensity profile to be obtained in the output beam.

Beam shaping with low energetic efficiency is generally undesired as it increases the energy consumption and heat generation of the device used in the production of a desired output beam. Also, use of low energetic efficiency beam shaping decreases the system Signal to the device. For example, for scanning systems operating in the UV regime, the Signal to Noise Ratio (SNR) of the system is related to the optical transmission of the system and thus use of attenuating beam shaping devices leads to reduced SNR of the scanning.

The present invention provides a novel beam shaping technique and method for calibrating the same. The system and method of the invention may be used for shaping coherent light beams with high precision and high energetic efficiency (e.g., in the order of 75% and up to 95%, and even above). In addition, the technique of the present invention improves the accuracy and precision of the shaped beam as compared with the conventional intensity and phase beam shaping techniques, thus enabling use of beam shaping of the present invention in highly precise applications and/or in short wavelength ranges. This is achieved by providing a calibratable intensity and phase beam shaper system and a method for calibrating the same. The intensity and phase beam shaper system may be based on refractive and/or diffractive optical elements.

The technique of the invention is based on the understanding that significant inaccuracies in the intensity and phase of the shaped beam are due to small lateral misalignments of the optical elements/modules of the beam shaping system with respect to the light beam.

The intensity and phase beam shaping systems include at least two optical modules, being the intensity redistribution and phase corrector modules, which should be precisely positioned (e.g. laterally aligned) with respect optical path. Calibrating such system according to the conventional approach is based on searching/scanning over a multiple combinations of the positions of those at least two optical elements/modules wherein the space of solutions is spanned by at least two (or more) degrees-of-freedom (DOF/parameters) associated with the lateral positions of the two optical modules. This requires lengthy procedure of calibration which often results with poor accuracy.

The present invention solves this problem by providing a calibratable beam shaping system and a calibration method according to which the operational parameters (DOF) of the optical modules of the beam shaping system can be independently and separately adjusted. For example, each of the operational parameters including positions/lateral-alignments of each of the intensity-redistribution and phase-corrector optical modules as well as a magnification (zoom) and/or collimation parameters of a beam expander optical module of such beam shaping system are adjusted separately and independently. The separation of the calibration variables/parameter allows faster calibration procedures since each parameter is calibrated independently thereby obviating a need to search/scan over the various combinations of these DOFs (scan the space of solutions spanned by the multiple calibratable parameters). Instead according to the invention, DOF(s) of each optical module is separately calibrated, consequently allowing faster calibration of the beam shaping system and better calibration accuracy.

Thus, the invention utilizes a first optical module/element(s) (being an intensity redistribution optical module) and a second optical module/element(s) (being a phase corrector optical module), both mounted along an optical path for shaping a light beam. The first and second optical elements are mounted on separate alignment modules (e.g. mini-stages) allowing their independent alignment with respect to the light beams to be shaped thereby. The invention also provides a calibration technique (system and method) enabling precise alignment between the first and second optical modules. The calibration (e.g. alignment) of the optical modules is performed sequentially such that optionally the width of the incident beam is calibrated first, then the alignment of the first optical module is adjusted and finally the alignment of the second optical module is adjusted.

The term alignment may indicate herein the position and/or orientation of the optical elements/modules (i.e. with respect to up to 6 degrees of freedom; up to three position related and three orientation related degrees of freedom). However, the inventors of the present invention have noted that lateral alignment of the optical intensity redistribution and phase corrector modules of an intensity and phase beam shaping system have significant impact on the performance of such beam shaping system. Accordingly, in some embodiments of the invention as described below, calibrating the lateral alignment of these optical modules is specifically sought. To this end, the terms lateral (lateral direction(s)) should be construed as the direction(s) of beam intensity is reshaped (i.e. direction orthogonal to the optical path/axis of a light beam propagation through the system). The invention thus provides laterally align (e.g. centralize the positions) of the intensity redistribution and phase corrector optical modules with respect to the optical path of the light-beam through the beam shaper.

The technique of the present invention provides improved energetic efficiency which is associated with an improved optical transmission of the beam shaping system as compared with other beam shaping techniques, such as attenuation based beam shapers. Accordingly, the beam shaping system of the invention may advantageously be incorporated with scanning systems to improve the optical transmission of the scanning system and by that improve the Signal to Noise ratio (SNR) of the scanner.

The system may for example be configured to operate on an input a DUV laser beam having a Gaussian energy distribution, to magnify the beam by a beam expander and to shape the beam in one direction to form a flat (top hat) intensity profile. For example, the beam shaping system of the present invention may be integrated into a flying spot based optical microscope which creates a streak line on an object plane which is imaged by an optical detector/light-collection-module. The signal of such an optical microscope is a product of the power generated by the light source and the optical transmission through the optical path and therefore by integrating the beam shaping system of the present invention in such an optical microscope, the signal of the optical microscope may be substantially improved. In some types of such microscopes (i.e. known as 'shot noise limited'), the noise is proportional to the square root of the signal therefore the SNR increases as the optical transmission is improved.

According to a broad aspect of the present invention there is provided a beam shaping module including a first and second optical modules accommodated in a spaced-apart relationship in an optical path of light propagating through the beam shaping module and sequentially applying beam shaping to light incident thereon. The first and second optical modules are respectively coupled a first and second alignment modules which are adapted for carrying the first and second optical modules. Each of the first and second alignment modules are configured and operable for laterally positioning a respective optical module carried thereby with respect to the optical path. The beam shaping module also includes a calibration module connectable to the first and second alignment modules and configured and operable to sequentially calibrate the respective lateral positions of the first and second optical modules and align their respective lateral positions with respect to the optical path and enable shaping of an incoming light beam of given predetermined wave-front and lateral intensity distribution to thereby form an output light beam having desired wave-front and desired lateral intensity distribution.

According to some embodiments of the present invention the first optical module, when laterally aligned with the optical path, forms, from the incoming light beam, an intermediate light beam having a desired lateral intensity distribution and certain intermediate wave-front at a certain optical distance along the optical path downstream from the first optical module. The second optical module, when laterally aligned with the optical path, forms from the intermediate light beam the output light beam having said desired wave-front and said desired lateral intensity distribution.

To this end the calibration module may be adapted to sequentially carry out the following:
i. determine misalignment of the first optical module with respect to the incoming light beam propagating along the optical path towards the first module;
ii. operate the first alignment module to align the lateral position of the first optical module with respect to the incoming light beam thereby forming the desired lateral intensity distribution in the intermediate light beam;
iii. determine misalignment of the second optical module with respect to the intermediate light beam propagating along the optical path towards the second optical module; and
iv. operate the second alignment module to align the lateral position of the second optical module with respect to the intermediate light beam to thereby form the desired wave-front and the desired lateral intensity distribution in the output light beam.

According to some embodiments the calibration module is operable for repeating i and ii until an aligned position of the first optical module is determined in i and repeating iii and iv until an aligned position of the second optical module is determined in iii.

The calibration module may include an imager and at least one optical routing assembly configured and operable for controllably interacting with at least one of the intermediate and output light beams for directing at least a portion thereof to the imager. The calibration module may also include a calibration controller connectable to the at least one optical routing assembly and to the imager, and configured to carry out the following:

in operation i above: operate the at least one optical routing assembly to obtain, from the imager, a first image data indicative of the intensity distribution of the intermediate light beam at the certain optical distance downstream from the first optical module, and processing the first image data to determine data indicative of misalignment of the first optical module with respect to at least one lateral axis and/or with respect to the light beam;

in operation iii above: operate the at least one optical routing assembly to obtain, from said imager, a second image data indicative of the intensity distribution of said output light beam in one of mid- and far-field with respect to the second optical module and processing the second image data to determine data indicative of misalignment of the second optical module with respect to the at least one lateral axis and/or with respect to the light beam.

In some embodiments of the present invention the processing of each image of the first and second image data includes determining a region of interest (ROI) in the image, and determining an asymmetry parameter value indicative of asymmetry of an intensity profile in the ROI with respect to the at least one lateral axis.

According to some embodiments of the present invention the beam shaping module is configured and operable for shaping the incoming light beam with a predetermined lateral intensity distribution being substantially Gaussian with respect to at least one lateral axis, and to form an output light beam of a desired intensity distribution being substantially top-hat intensity distribution with respect to that certain lateral axis. To this end beam shaping may be different with respect to the two lateral axes and in such cases at least one of said first and second optical modules may be an aspheric optical element.

In some embodiments the beam shaping module is configured and operable for operating with the input light beams of a wavelength within the UV to DUV wavelength range. The calibration module may be adapted to calibrate the position of alignment for at least one of the first and second optical modules with precision of up to few tens of microns.

According to some embodiments of the present invention the beam shaping module also include a beam expander, having an adjustable magnification ratio. The beam expander may be located along the optical path of the incoming light beam upstream of the first optical module. The calibration module may be configured and operable for calibrating the width of the incoming light beam to a predetermined size by controlling a magnification ratio of the beam expander, and thereby improve the accuracy of shaping of the incoming light beam. To this end, the beam shaping module may include an optical routing assembly that is adapted to controllably direct light, interacting with the beam expander, to an imager. The calibration module may includes a calibration controller connectable to the imager for receiving therefrom image data indicative of a width of the incoming light beam and generating operational instructions for controlling the magnification ratio. For example the calibration module may be configured and operable to calibrate the width of the incoming light beam prior to sequential calibration of the positions of the first and second optical modules.

According to another broad aspect of the present invention there is provided a beam shaping module including a first and second optical modules accommodated in a spaced-apart relationship in an optical path of light propagating through the beam shaping module and sequentially applying beam shaping to light incident thereon. The beam shaping module also includes a calibration module including:
an imager,
at least one optical routing assembly configured and operable for controllably interacting with light propagating through the optical path for directing at least a portion thereof to the imager; and
a calibration controller connectable to a first and second alignment modules associated with the first and second optical modules respectively and operable for sequentially calibrating the respective lateral positions of the first and second optical modules with respect to a light beam propagating in the optical path by carrying out the calibration operations indicated in relation to operations (i) and (iii) above.

Specifically the calibration controller may carry out the following: operate the optical routing assembly to obtain, from the imager, a first image data indicative of an intensity distribution of the intermediate light beam at the certain optical distance downstream from the first optical module, and processing the first image data to determine data indicative of misalignment of the first optical module and operating said first alignment module to align the first optical module with respect to the light beam; and operate the optical routing assembly to obtain, from the imager, a second image data indicative of an intensity distribution of the light beam in one of mid- and far-field with respect to the second optical module, processing the second image data to determine data indicative of misalignment of the second optical module, and operating the second alignment module to align the second optical module with respect to the light beam. By accordingly aligning the first and second optical modules, an output light beam having a desired wave-front and a desired lateral intensity distribution is formed.

According to yet another broad aspect of the present invention there is provided a control system for use in calibrating an intensity and phase of an incoming light beam passing through a beam shaping module which has first and second optical modules sequentially interacting with the incoming light beam. The control system includes a calibration controller configured and operable for controlling lateral alignment of each of the first and second optical modules with the optical path, to thereby enable shaping of a coherent incoming light beam of given predetermined wave-front and lateral intensity distribution to form an output light beam having desired wave-front and desired lateral intensity distribution.

According to some embodiments the calibration controller is configured and operable to carry out the following sequentially:

i. monitoring an intensity distribution of an intermediate light beam formed by interaction of the incoming light beam with the first optical module, determining data indicative of a lateral misalignment of the first optical module, and operating the first lateral alignment module to align the first optical module for forming the desired intensity distribution of the intermediate light beam at the certain optical surface; and ii. monitoring an intensity distribution of the output light beam in at least one of the mid- and far fields with respect to the second optical module corresponding to the wave-front structure of the output light beam, and thereby determining data indicative of a lateral misalignment of the second optical module and operating said second lateral alignment module to align said second optical module to form the output light beam with the desired intensity distribution and wave-front.

In some cases determining lateral misalignment in at least one of said first and second optical modules comprising processing the corresponding intensity distribution, which is respectively associated with one of the intermediate and output light beams, to determine asymmetry parameter value indicative of the lateral misalignment.

According to yet further aspect of the present invention there is provided a method for calibrating a beam shaping module including a first and second optical modules sequentially interacting a light beam for shaping the intensity profile and wave front of the light beam. The method includes carrying out the following steps sequentially:

i. calibrating a lateral position of the first optical module by: imaging the light beam after its interaction with the first optical module to capture a first image data indicative of a first intensity distribution of the light beam at a certain optical distance downstream from the first optical module, and utilizing the first intensity distribution to determine a laterally aligned position of the first optical module; and ii. calibrating a lateral position of the second optical module by: imaging the light beam after its interaction with the first and second optical modules where the first optical module is in the lateral aligned position to thereby capture a second image data indicative of a second intensity distribution of the light beam at a certain location downstream from the second optical module. Then utilizing the second intensity distribution to determine a laterally aligned position of the second optical module.

The method thereby allows calibrating the beam shaping module for shaping a coherent incoming light beam of predetermined lateral intensity distribution to form an output light beam having a different lateral intensity distribution.

According to some embodiments of this method, in operation (i) above, the certain optical distance, at which said first image data is captured, substantially equals the optical length between the first and second optical modules. Also in operation (ii) above, the certain location, at which the second image data is captured, is in the mid/far field with respect to the second optical module.

Also, determining a laterally aligned position of at least one particular optical module of the first and second optical modules may include processing a corresponding particular intensity distribution of the first and second intensity distribution to determine a value of an asymmetry parameter in the particular intensity distribution being indicative of a lateral misalignment of the at particular optical module.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 is a schematic illustration of a known in the art attenuating beam shaping system typically used in shaping beams of deep-ultraviolet light.

FIG. 2 is a block diagram illustrating a method 200 according to the invention for shaping intensity distribution and wave front of a light beam.

FIGS. 5B to 5H illustrate graphically and schematically the operation of method steps 510, 520 and 530 of method 500 of FIG. 5A.

DETAILED DESCRIPTION OF EMBODIMENTS

Figure 3A:
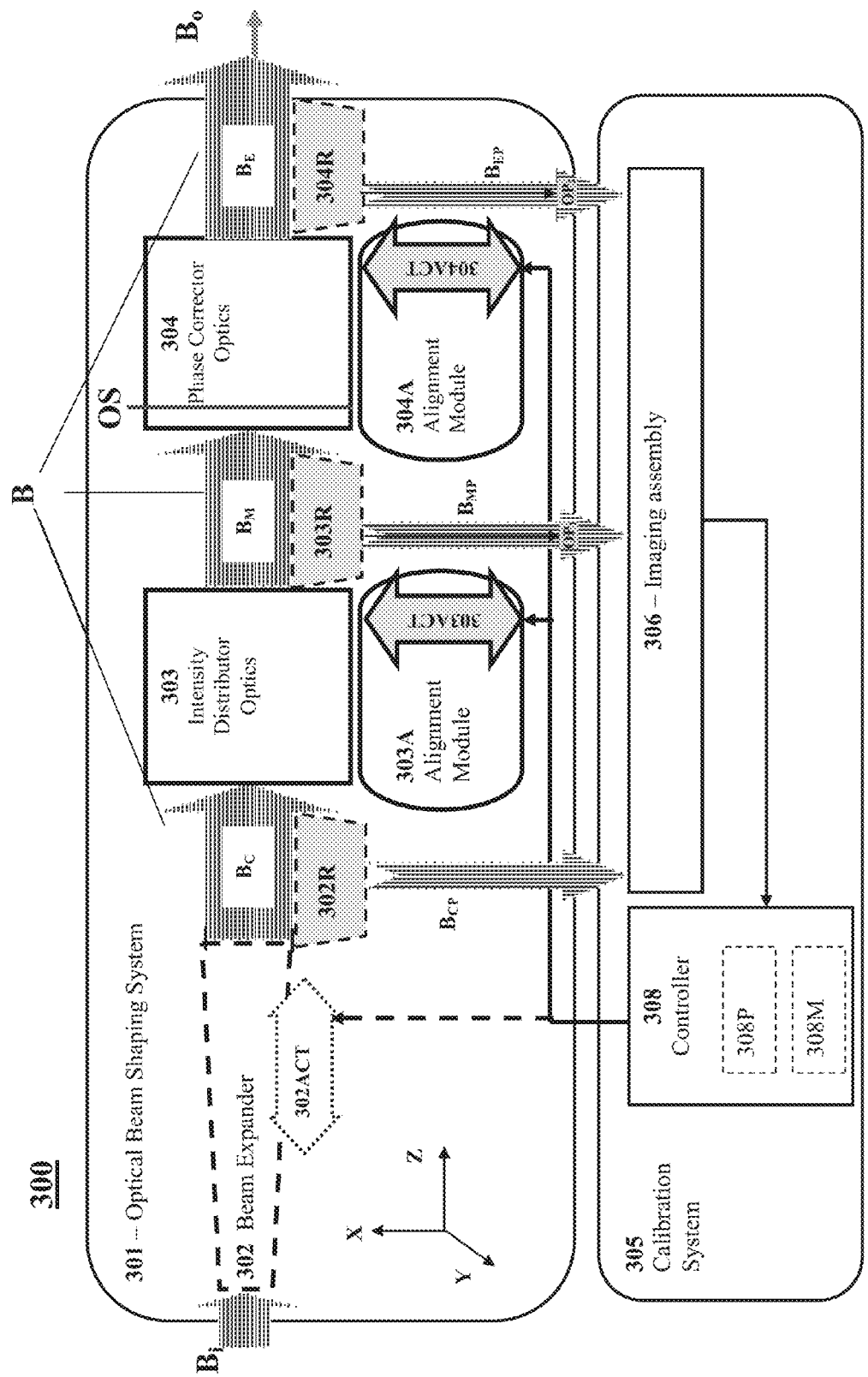
FIG. 3A is a block diagram schematically illustrating a beam shaping apparatus 300 configured and operable according to the present invention and including an optical beam shaping system 301 and a calibration system 305.

Reference is made to FIG. 2 illustrating showing a block diagram 200 of a method according to the invention for shaping intensity distribution and wave front of a light beam. Method 200 is operable in accordance with a intensity and phase beam shaping techniques thus providing high transmission efficiency with low energy losses in the light intensity. Method 200 is particularly suited for use in beam shaping modules adapted for shaping intensity distribution of coherent light beams and typically substantially collimated light beams. Also the method may be used for shaping light beams of short wavelengths for example in the UV and deep UV regimes. This is achieved, as described below, by providing a technique for precise calibration of the positions, of the beam shaping optical elements with respect to the optical path of the light beam. Method 200 includes the following:

(210) providing a beam shaping system including an intensity-redistribution and phase-corrector optical modules arrange along an optical path and optionally also including a beam expander module located upstream from the intensity-redistribution and phase-corrector optical modules. The intensity-redistribution optical module is configured for interacting with an incoming light beam having a certain predetermined intensity profile (i.e. intensity distribution) and for affecting its propagation to form an intermediate light beam having a certain desired intensity profile at a certain optical surface located a certain distance along an optical path of the intermediate light beam downstream from the intensity-redistribution optical module. The phase-corrector optical module is located at about that certain distance downstream from the intensity-redistribution optical module (e.g. at that certain optical surface) and is configured for affecting the phase of the intermediate light beam with the certain predetermined wave-front to form an output light beam having a certain desired wave-front. The optional beam expander module is adapted for interacting with the incoming light beam upstream from the intensity-redistribution optical module and enabling adjustment of a width of the incoming light beam, to obtain the predetermined intensity profile of the incoming light beam.

(220) mounting each of the intensity-redistribution and phase-corrector optical modules for adjustable lateral movement with respect to the optical path. The in various embodiments of the present invention associated with one and/or two dimensional beam shaping the lateral positions of the optical modules may be adjustable with respect to one or two lateral axes orthogonal to the optical path.

(230) providing a calibration module configured for determining desired lateral alignments of the intensity-redistribution and phase-corrector optical modules, and optionally also determining a desired beam expansion (zoom) by the beam expander. For aligning the intensity-redistribution optical module, the calibration module is configured for controllable interaction with the intermediate light beam after its interaction with the intensity-redistribution optical module and prior to its interaction with the phase-corrector optical module. The calibration module is adapted for measuring the light beam's intensity profile, as affected by the intensity-redistribution optical module, and to thereby determine a desired lateral alignment between the intensity-redistribution optical module and the incoming light beam, for obtaining the certain desired intensity profile of the output light beam. Specifically, in some embodiments of the present invention symmetry/asymmetry parameter(s) of the intensity profile is/are measured and/or processed at this stage provide indication to the lateral alignment (e.g. degree of alignment/misalignment) of the intensity-redistribution optical module. For aligning the phase-corrector optical module, the calibration module is configured for controllable interaction with the output light beam after its interaction with the phase-corrector optical module. The calibration module is adapted for measuring the intensity profile of the light beam, at the mid- and/or far-field (i.e. Fresnel's regime). In this region (mid-field) and/or in the far-field regime, wave front errors are converted into asymmetry of the intensity of the beam profile (e.g. due to rapid diffraction effects developed in the mid-field on the edges of top hat profile propagating in the free space and/or diffraction effect affecting the far-field pattern). To this end, in some embodiments of the present invention symmetry/asymmetry parameter(s) of the profile are measured and/or processed at this stage provide indication to the lateral alignment (e.g. degree of alignment/misalignment) of the phase-corrector optical module. Accordingly, the calibration module utilizes the measured asymmetry to thereby determine a desired lateral alignment of the phase-corrector optical module with respect to the intermediate light beam for obtaining the certain desired wave-front of the output light beam. Optionally the calibration module is also adapted for calibrating the magnification ratio of an optional beam expander which may be included in the beam shaping system. In such cases the calibration module is adapted for interacting with the incoming light beam after its interaction with the beam expander and prior to its interaction with the intensity redistribution module and for measuring the intensity profile (e.g. determining the width) of the incoming light beam and thereby determine a desired magnification ratio (zoom) to be provided by the beam expander module for obtaining an output light beam with the desired intensity distribution and wave front.

(240) calibrating the intensity distribution and wave front of an output light beam by operating the above described calibration module(s) provided in 230 for sequentially carrying out the following: First, optionally, adjusting the beam expander's zoom; then, adjusting the lateral alignment between the intensity-redistribution optical module and the incoming light beam; and finally adjusting the lateral alignment between the phase-corrector module and the intermediate light beam.

Thus, method 200 described above allows to apply beam shaping to an input light beam of a certain predetermined intensity distribution and wave-front and to obtain an output light beam with a desired intensity distribution and wave-front. The method may be operated with high efficiency in the order of 75 to 95 percent for converting a coherent beam of Gaussian intensity distribution to a coherent beam of Top-hat intensity distribution. The residual losses in the order of 5 to 25 percent may result for example from: (i) imperfect optical transmission of the optical components; (ii) the Gaussian beam having infinite tail of some energy which is delimitated due to the finite size of the optical elements); and tolerances of the elements and/or their alignment.

Reference is now made to FIG. 3A showing a block diagram 300 schematically illustrating a beam shaping apparatus configured and operable according to the present invention. The principles and operation of method 200 above may further be understood with relation to configuration and operation of the beam shaping apparatus 300 which implements method 200. Apparatus 300 includes an optical beam shaping system 301 operative according to an intensity and phase beam shaping technique, and a calibration system 305 connectable to the beam shaping system 301. The optical beam shaping system 301 in this example is configured and operable for applying a predetermined intensity and phase beam shaping to a coherent light beam inputted thereto for producing an output coherent light beam having a desired shape (intensity profile and wave front). In some cases the system is adapted for receiving a collimated input beam (with substantially planar wave front) having a certain lateral intensity distribution and shaping the beam to produce, at the output, a collimated beam (i.e. planar wavefront) with a desired predetermined intensity distribution. The calibration system 305 is configured and operable for adjusting the optical operation of system 301 for shaping an incoming light beam $B_i$ having a certain predetermined intensity profile/distribution and wave front to form an output light beam $B_o$ having a certain desired intensity distribution and wave front.

The optical beam shaping system 301 includes an intensity redistribution optical module 303 and a phase correction optical module 304, both arranged along a longitudinal optical path OX of the light beam $B_i$ and mounted for lateral alignment therewith. The phase correction optical module 304 is located at a certain predetermined distance downstream from the intensity redistribution optical module 303 with respect to the light propagation direction. System 301 also includes two alignment modules 303A and 304A (e.g. adjustable mini stages) respectively coupled with optical modules 303 and 304 and adapted to enable adjusting the lateral alignment of their respective optical modules 303 and 304 with respect to the light propagation path (e.g. axis) OX of light beam $B_i$ (e.g. by laterally moving the optical modules in one or more directions orthogonal to the optical path OX). Optionally, system 301 also includes a beam expander module 302 located upstream from the intensity redistribution optical module 303 and configured and operable to controllably expand and/or contract the width of the incoming light beam $B_i$ with respect to at least one lateral direction intersecting/perpendicular to the optical path OX. The beam expander is typically adapted to interact with an incoming collimated light beam to change its width while providing collimated light beam at its output.

Calibration system 305 is configured and operable monitoring/determining and calibrating the optical operation of the optical beam shaping system 301 and controllably adjusting the operation of one or more optical modules of system 301. Calibration system 305 includes an imaging assembly 306, which includes one or more imagers, and is configured and operable for imaging intensity profiles (i.e. one or two dimensional intensity distribution) of portion(s) of the light beam $B_i$ directed to the imaging assembly from certain positions along the optical path OX. Calibration system 305 also includes a calibration controller 308 that is connectable to the imaging assembly 308 for receiving image data therefrom. The calibration controller 308 is configured and operable for processing image data associated with the light beam intensity distribution after its interaction with certain optical elements/modules of system 301 and determine alignment data indicative of a desired aligned position of those optical modules. To this end the calibration controller 308 may include a processor 308P, such as a general purpose processor or a digital-signal-processor (DSP), configured and operable for processing and analyzing image data received from the imaging assembly 306 to determine calibration operations to be applied to the beam shaping system 301. The calibration controller 308 may also include a memory/storage module 308M for storing data/formula/algorithms which are used by the calibration controller 308 (e.g. by processor 308P) in determination of the calibration operations.

Calibration system 305 may also include actuation modules 303ACT and 304ACT which are respectively coupled to the alignment module 303A and 304A of the optical beam shaping system 301. Controller 308 is connectable to the actuation modules 303ACT and 304ACT and configured to generate operational instructions (e.g. operational calibration data/signals) for operating the actuation modules, 303ACT and 304ACT, in accordance with the determined alignment data to thereby align the positions of the optical modules 303 and 304 of system 301 with respect to the optical path OX.

Typically, in order to obtain an output beam with desired intensity distribution and wave-front, the incoming beam $B_C$ inputted to the intensity redistribution optical module 303 should have a certain predetermined width within a certain tolerance level (e.g. of about 2 percent from a certain nominal width to which the system is designed). This is because the intensity distribution of the intermediate light beam $B_M$ at the optical surface OS is typically susceptible to the width of the input light beam $B_C$.

To this end optionally, according to some embodiments of the invention, the calibration system 305 is adapted for calibrating the width of the incoming light beam $B_C$. In such embodiments, the calibration system 305 is adapted to inspect (e.g. image and analyze) properties of the beam $B_C$ after its interaction with the beam expander module 302 and generate operational instruction for operating beam expander 302 to properly adjust the width of the light beam to a specific width. The calibration system 305 may be associated with an optical routing assembly 302R which can be operated to engage with the input light beam $B_C$ for directing at least a portion $B_{CP}$ thereof to interact with the imaging assembly 306. Portion $B_{CP}$ may be redirected to the imaging assembly 306 after light interacts with the beam expander. Imaging assembly 306 provides the controller 308 with imaging data indicative of the portion $B_{CP}$ and, in turn, the controller 308 processes the provided imaging data, determines the width light beam $B_C$ and accordingly generates operative instructions for adjusting the zoom property of the beam expander 302. The beam expander 302 may be, in this case, an adjustable beam expander with variable zoom capabilities and the calibration controller 308 may be associated with an actuation module 302ACT of the beam expander 302 for operating it to control the magnification ratio (zoom) of the beam expander 302 and thereby affecting the width of light beam $B_C$. This procedure of calibrating the width of the incoming light may be repeated until the input light beam $B_C$ reaches a desired width within a certain desired tolerance threshold. Typically, the actuation module 302ACT includes two stepper motors which are operated in order to set the desired optical Zoom (i.e. to obtain a desired beam width) while maintaining collimation of the beam.

As noted above, the optical beam shaping module 301 of the invention is operable in accordance with an intensity and phase beam shaping technique. To this end, the intensity redistribution optical module 303 is adapted for receiving, as an input, a light beam $B_C$ of a certain width, intensity distribution and wave-front, and to redistribute light rays of that light beam such as to form an intermediate light beam $B_M$ having a certain desired intensity distribution and width at a certain optical surface OS downstream from the intensity redistribution optical module 303. Typically, such an intensity redistribution optical module 303 may be implemented by an assembly of one or more lenses (i.e. diffractive and/or refractive lenses, e.g. possibly utilizing a single aspheric lens) designed in accordance with the wave-front and intensity distribution of the input light beam $B_C$ and according to the desired intensity distribution to be obtained by the intermediate beam $B_C$ at the optical surface OS.

The intensity distribution of the intermediate light beam $B_M$ at the optical surface OS is typically susceptible to the lateral alignment between the intensity redistribution optical module 303 and the input light beam $B_C$. Indeed, in some cases (e.g. for certain light wavelengths such as visible light), mismatches in such lateral alignment may present tolerable effects on the systems operation. This is because typically the distance between the optical elements is in direct/positive proportion with respect to the wavelength. Therefore, for a certain beam width, the ratio of the distance between the optical elements and their width increases with the wavelength. Thus the required alignment accuracy may be loss for longer wavelengths. However, for light sporting short wavelengths (such as for light in the UV and Deep-UV regimes) even minor mismatches in the lateral alignment between intensity redistribution optical module 303 and the light beam $B_C$ may introduce significant errors to the intensity distribution obtained at the optical surface OS.

In many cases (e.g. when shaping light beams of short wavelengths) the alignment between the intensity redistribution optical module 303 and the light beam $B_C$ should be precisely calibrated. This is achieved according to the invention by configuring the calibration system 305 for monitoring/detecting the intensity distribution of the intermediate light beam $B_M$ and accordingly aligning the optical module 303 with respect to the light beam $B_C$.

According to some embodiments of the invention, the calibration system 305 is associated with an optical routing assembly 303R which may be operated to interact with the intermediate light beam $B_M$ for directing at least a portion $B_{MP}$ thereof to interact with the imaging assembly 306. In turn, imaging assembly images the intensity profile/distribution of that light portion $B_{MP}$ and provides corresponding imaging data, (referred to herein as first image) to the controller 308. Controller 308 analyzes the provided first image data, and determines operative instructions for alignment of the intensity redistribution optical module 303.

According to some embodiments of the invention, the length of the optical path between the intensity redistribution optical module 303 and the imaging assembly 306, along which light portion $B_{MP}$ propagates, is configured to be substantially equal to the optical distance between the re-distribution optical module 303 and the optical surface OS. For example the optical routing assembly 303R may be adapted to direct light portion(s) $B_{MP}$ to propagate along an optical path OP1 having an optical length that substantially equals the optical length between the optical module 303 and surface OS. Accordingly, the imaging assembly 306 captures an image (i.e. being the first image data) of the intensity distribution of the intermediate light beam $B_M$ as it would appeared at the optical surface OS if routing assembly 303R had not being engaged with the intermediate light beam $B_M$. The controller 308 utilizes a model (e.g. an algorithm), which is indicative of the effects of misalignment of the optical module 303 on the first image (namely intensity image indicative of the intensity distribution of the intermediate light beam at the surface OS), to determine actuation instructions for proper alignment of the intensity redistribution optical module 303. Such model may, for example, be stored in the controller memory module 308M. The model may indicate correspondence between different alignments of the optical module 303 and the resulting intensity distribution of the intermediate light beam $B_M$. The model may be used (e.g. compared) with the captured first image data of the intermediate light beam portion $B_{MP}$ to determine a deviation between the current and the desired output intensity distribution and thereby determine data indicative of the misalignment of the intensity redistribution optical module 303.

It should be noted that according to various embodiments of the invention, the routing assembly 303R may be configured to direct the light beam portion $B_{MP}$ to propagate to the imaging assembly 306 imager along various optical paths OP1 having different lengths. Accordingly the controller 308 may utilize different models, or possibly other technique, in order to determine the lateral alignment of the optical module 303.

More specifically, in the present example, for an aligned position of the optical module 303 with respect to the lateral X axis, the intensity distribution at surface OS is expected to be substantially symmetrical with respect to that axis (X), while lateral misalignments of the optical module 303 with respect to that axis are expected to produce respective asymmetries in the intensity distribution. In specific cases where the system is configured as Gaussian to Flat beam shaper, a substantially symmetric Top-hat intensity profile (e.g. flat Top-hat intensity profile with about zero slop) is to be obtained at surface OS after the beams interaction with the intensity redistribution optical module 303 when the later is properly aligned. Misalignment of the intensity redistribution optical module 303 would introduce in this case a non-symmetric profile appearing as non-flat Top-hat.

Accordingly, the calibration controller 308 may be configured to determine a measure of asymmetry with respect to that certain axis (X) in the intensity distribution and thereby determine whether the optical module 303 is misaligned, the direction of misalignment and possibly also the magnitude of misalignment. The measure of asymmetry may be obtained by calibration controller 308 by processing the intensity distribution and performing operations that are equivalent to multiplying the intensity distribution by an anti-symmetric function and integrating the multiplication result to obtain an asymmetry parameter/indicator (e.g. scalar value). Alternatively or additionally, the measure of asymmetry (asymmetry parameter value) may also be obtained utilizing other suitable techniques. For example when a Top-hat intensity distribution is to be obtained by the beam shaping, the measure of asymmetry may correspond to the flatness of the Top-hat (e.g. the average slop/derivative of the resulting Top-hat intensity profile).

In this connection, is should be understood, that in some embodiments of the invention, only a region of interest (ROI) of the image data (e.g. corresponding to the central part of the spot/beam at which the top-hat is flat) is analyzed. A technique for determining the ROI in the image data is described for example more specifically below in connection with method steps 520 and 530 of FIG. 5.

For a two dimensional case, the two dimensional intensity distribution (INd[x,y]) may be processed to determine a measure of asymmetry of the distribution with respect to one or both of the lateral axes to thereby enable aligning the optical module 303 with respect to any one or both of the lateral axes (X, Y). For example to determine the asymmetry measure with respect to a certain lateral axis (X), a one dimensional intensity profile (INd[x]) corresponding to that axis may be obtained from the two dimensional intensity distribution (e.g. by proper selection/cropping of a slice of the two dimensional intensity distribution image and/or by integrating the intensity distribution image in the lateral direction perpendicular to the certain lateral direction). The asymmetry measure of the one dimensional intensity profile may then be obtained by multiplying the profile by an anti-symmetric function and integrating over that certain lateral axis (X). It is noted that the above procedures may be carried out independently to align the intensity re-distribution module along two lateral axes (X, Y).

The value of the asymmetry parameter may indicate the direction of misalignment of the optical module 303 with respect to the certain lateral axis and possibly also the magnitude of the misalignment. In this regards, it should be noted that the anti-symmetric function may be selected to enable determination of the asymmetry indication (asymmetry parameter value) with improved accuracy, for example by selecting a function that gives different weights to different regions/parts of the intensity distribution (e.g. by selecting polynomial function of a suitable odd order/power).

The calibration controller 308 may be configured to recursively determine the asymmetry parameter and apply matching alignment adjustment to the optical module 303, and repeat this process until sufficiently aligned position of the optical module 303 is obtained (indicated by sufficiently symmetric value of the asymmetry parameter). Alternatively or additionally, the anti-symmetric function may be selected to generate a certain functional relationship between the asymmetry parameter value, which is obtained thereby, and the magnitude of misalignment of the optical module. That is, the function may for example be selected such that a linear correspondence is obtained between the asymmetry parameter and the misalignment distance of the optical module 303. Optionally, alternatively or additionally, in order to estimate the magnitude/distance of the misalignment, the controller 308 may utilize a model (e.g. lookup table (LUT) or formula) which relates asymmetry parameter values with misalignment magnitudes/distances.

Having determined data indicative of the misalignment of the intensity redistribution optical module 303, the calibration controller 308 is configured and operable to adjust the position/alignment of the intensity redistribution optical module 303 with respect to the optical path OX. To this end, the calibration controller 308 may connectable to the actuation module 303ACT and adapted for generating operative instructions for operating actuation module 303ACT to better align the optical module 303 (e.g. by actuating the alignment module 303A). The procedure of alignment/calibration of the position (and possibly orientation) of the optical module 303 may then be repeated until the optical module 303 is properly positioned with respect to the input light beam $B_C$ up to a sufficient tolerance level.

After the optical module 303 had been properly aligned to provide the desired output intensity distribution, an alignment of the phase correction optical module 304 is carried out in order to correct the phases of light rays of the intermediate light beam $B_M$ at the optical surface OS with no impact on the intensity profile and to thereby provide an output light beam with the desired wave-front. It is noted the position of the optical module 303 affects the phase of the intermediate light beam $B_M$ and thus the phase of the intermediate light beam $B_M$ is preferably corrected by calibrating/aligning the phase corrector optical module 304 only after the position of the intensity redistribution optical module 303 was properly aligned/calibrated.

The calibration module 305 is configured and operable for determining data indicative of the wave-front of the output light beam $B_E$ after its interaction with the phase correction optical module 304 and to determine misalignment of the phase correction optical module 304. In this regards, determining the wave-front (i.e. phase-distribution of a light beam at a certain optical surface) is not straight forward. Wave front can be measured with the aid of wave front sensor (i.e. interferometer, Shack Hartmann Sensor, etc.) but adding such to the system 300 would significantly add to its complexity.

This problem is solved by the present invention by noting that the phase distribution (wave front structure) of a light beam in a near field optical region (e.g. at the vicinity of the optical surface OS) affects the light intensity distribution in the mid and/or far field regions. To this end, the wave-front structure of the light beam at the near field (near OS) can be determined/estimated with good accuracy by measuring (e.g. imaging) the intensity distribution of a light beam in the far/mid fields/regimes with respect to surface OS, and accordingly the wave front at near field may be tuned utilizing one or more such measurements in the far/mid fields. It should be noted that here the term near field may be considered as region of the optical field for which the Fresnel number F is greater or equals to 1 (e.g. $F=a^2/(L\lambda)\geq1$— where a is the characteristic size of the aperture/optical-element, L is the distance from the aperture/optical-element, and $\lambda$ is the wavelength). The terms mid- and far fields may be considered as regions from which the Fresnel number F is smaller than 1 (e.g. far-field is the region where Fresnel number–F<<1 while the mid field is where F~1).

Specifically according to the present invention the impact of the wave front error of a top hat beam in the near field on the diffracted pattern of the beam in the mid/far fields can be measured and used to estimate/correct misalignment of the phase correction optical module 304. In the near (and Mid/Far) field regime, the immediate effect of propagating top hat beam with sharp edges would be growing horns. A top hat characterized by a distorted wave front would grow uneven horns. In other words, by measuring (e.g. imaging) the intensity distribution of a diffracted (i.e. after propagation in the free space) flat light beam, the wave-front error of the light can be indicated and tuned.

Thus, according to some embodiments of the invention, the calibration system 305 may be associated with an optical routing assembly 304R that is adapted for controllable engagement with at least a portion $B_{EP}$ of the light beam $B_E$, after its interaction with the phase correction optical module 304, and for directing that portion $B_{EP}$ to propagate to the imaging assembly 306 along an optical path OP2 that is selected to provide diffracted top hat imaging of that portion $B_{EP}$. The imaging assembly 306 captures image data indicative of the mid-/far-field intensity distribution of the light beam $B_E$ (this image data is referred to herein as second image data) and the calibration controller 308 may utilizes the mid-/far-field intensity distribution (namely the second image data) to determine alignment data that is indicative of the position of the phase correction optical module 304 with respect to the intermediate light beam $B_{IM}$.

The calibration controller 308 may be adapted to utilize a model (data, formula or algorithm) to process captured image data (second image data) indicative of the far-/mid-field intensity distribution of light beam $B_E$ to thereby generate operative instructions (operational data/signals) for alignment of the phase correction optical module 304. For example, determining a ROI in the captured image data and comparing the ROI of the image against a model of the intensity distribution that should be obtained in the mid field in an aligned state of the phase correction optical module 304 and utilizing that comparison to determine misalignment data indicative of a direction and/or magnitude of misalignment of the optical module 304. Then, operative instructions may be accordingly generated for operating actuation module 304ACT to align the optical module 304. The procedure of calibrating/aligning the phase corrector optical module 304 may optionally be repeated until the optical module 304 is aligned up to a sufficient tolerance level.

To this end, for example, in an aligned state of the optical module 304 the mid-/far-field intensity distribution is generally substantially symmetric while presenting substantial asymmetry even in small misalignments of the optical module 304 (e.g. misalignment of few tens of microns). Thus, by determining the asymmetry in the captured mid-/far-field intensity distribution, data indicative of the misalignment (direction and/or distance) of optical module may be obtained. Determination of misalignment data for optical module 304 may be obtained by processing the ROI of the mid-/far-field intensity distribution and determining an asymmetry parameter indicative of the asymmetry of the intensity distribution in the ROI. Determining the asymmetry parameter may be performed in any suitable manner as will be readily appreciated by those skilled in the art. For example similarly to the described above, the calibration controller 308 may be configured to multiply the captured mid-/far-field intensity distribution by an anti-symmetric function. The function may be anti-symmetric with respect to a lateral axis with respect to which misalignment should be determined. Then the calibration controller 308 may integrate the result of the multiplication to obtain a certain asymmetry parameter value indicative of misalignment of the optical module 304 along this lateral axis. Similar procedure may also be carried out for aligning optical module 304 along a second lateral axis.

As noted above, the anti-symmetric function may be specifically selected also to operate as a weighting function for improving correlation between the resulted asymmetry parameter value and direction/magnitude of the misalignment state of the module 304. Possibly, a model (e.g. data, LUT or formula) are used, in conjunction with the thus obtained asymmetry parameter value, to determine the magnitude (distance) of the lateral misalignment of the module 304. Thus asymmetry parameter value may be used to determine the operative instructions for aligning the phase correction optical module 304.

Figure 3B:
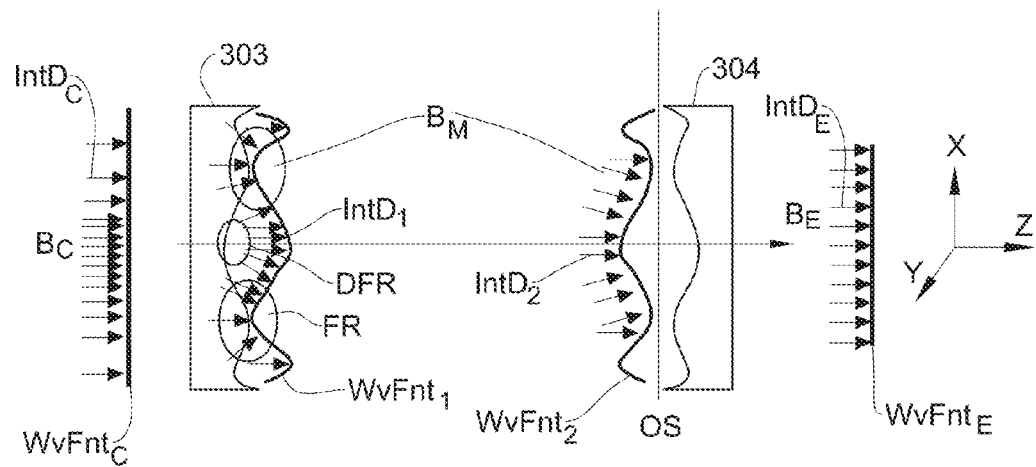
FIGS. 3B and 3C illustrate the optical operation of the intensity-redistribution (303) and phase-corrector (304) optical modules of the optical beam shaping system 301 shown in FIG. 3A.
Figure 3C:
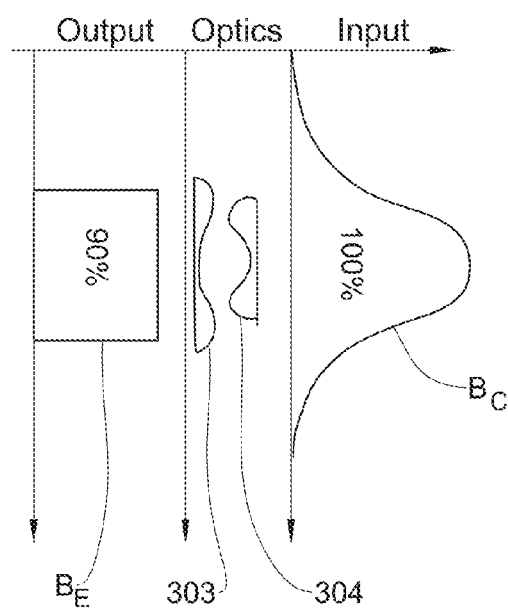

Reference is now made to FIGS. 3B and 3C illustrating schematically the optical operation of the intensity-redistribution and phase-corrector optical modules 303 and 304 of the optical beam shaping system 301. The operation of optical modules 303 and 304 on an incoming light beam $B_C$ is illustrated in a state where both the modules 303 and 304 are substantially laterally aligned with respect to the light beam.

Here, the optical elements, 303 and 304, are designed to operate in alignment with respect to an incoming light beam $B_C$ having a planar wave-front $WvFnt_C$ and Gaussian intensity distribution $IntD_C$ and to affect the propagation of that light beam for producing an output light beam $B_E$ having a planar wave-front $WvFnt_E$ and top-hat intensity distribution $IntD_E$. The intensity redistribution optical element 303 is designed with suitable focusing and de-focusing regions FR and DFR which are configured to redirect light rays of the Gaussian distributed incoming beam $B_C$ such as to form an intermediate light beam $B_M$ having a top-hat intensity distribution at the optical surface OS. The intensity of the light beams is designated in the figure by the density of the arrows indicating light rays of the light beam. After interaction with the intensity redistribution optical element 303, the wave-front $WvFnt_1$ of the intermediate light beam $B_{IM}$ becomes different from the planar waveform $WvFnt_C$ of the incoming beam $B_C$ and is further changed to wave-front $WvFnt_2$ during propagation of the light beam towards the optical surface OS at which the desired output intensity distribution (e.g. top-hat) is obtained. In the vicinity of surface OS, the phase corrector optical module 304 is located. The phase corrector module is configured to affect the wave-front $WvFnt_2$ of the intermediate light beam to produce the desired wave-front $WvFnt_E$ of the output beam $B_E$ (e.g. planar wave front).

In the example of FIG. 3B the intensity redistribution optical module 303 and the phase corrector optical module 304 are implemented by refractive optical elements/lenses. The Gaussian lateral intensity profile of the incoming light beam $B_C$ and the top-hat lateral profile of the output light beam $B_E$ from such refractive optical elements are illustrated schematically in FIG. 3C. The total intensity transmission efficiency obtained by this arrangement of refractive optical elements is indicated in FIG. 3C to be about 90%.

Figure 3D:
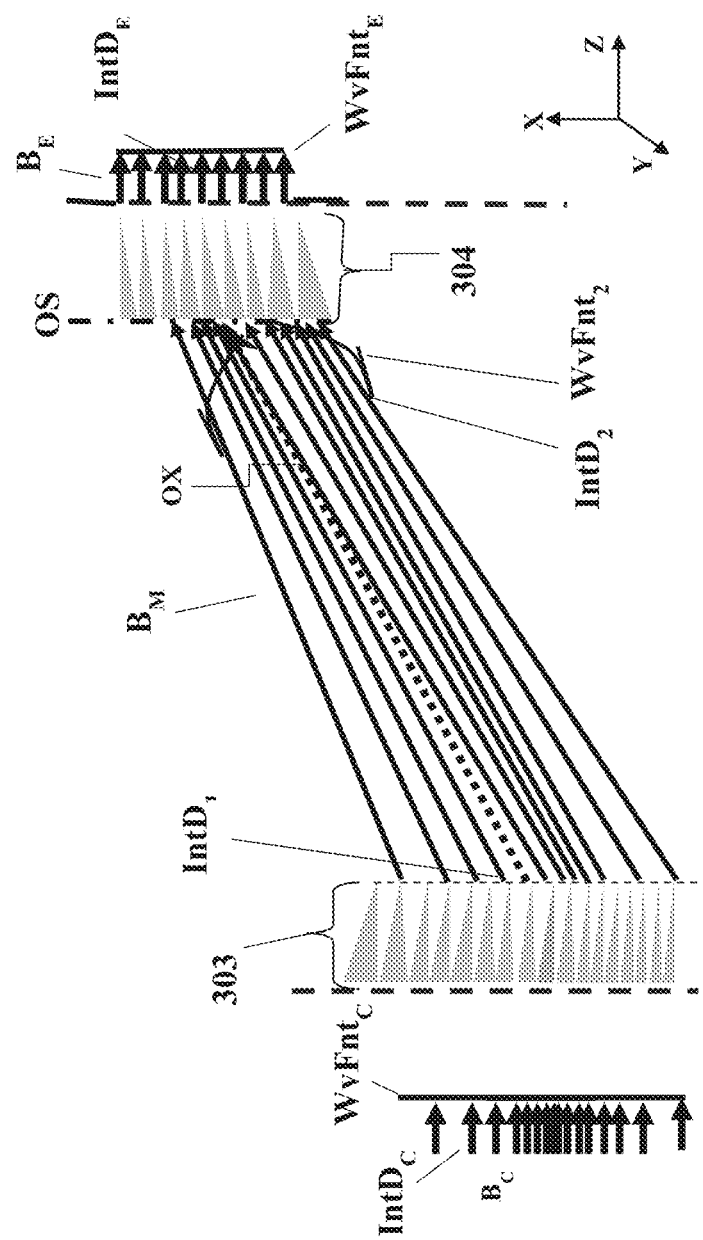
FIGS. 3D to 3F illustrate the optical operation of intensity-redistribution and phase-corrector optical modules which are implemented utilizing diffractive optical elements.

Referring now to FIG. 3D, there is schematically illustrated the optical operation of an optical beam shaping system 301 according an embodiment of the invention in which the intensity-redistribution and phase-corrector optical modules 303 and 304 are configured and implemented utilizing diffractive optical elements. In this regards as noted above the intensity and phase beam shaping system 301 of the present invention may be implemented utilizing refractive and/or diffractive optical modules/elements wherein the same principles of intensity redistribution and phase correction described above with reference to FIG. 3B are also applicable for the diffractive case of FIG. 3D. In this connection reference numerals similar to those used in FIG. 3B to denote the light beam properties (e.g. intensity distribution and wave front) are also used FIG. 3D.

The diffractive approach is based on use of two diffractive components (i.e. optical elements/modules such as gratings) that are respectively configured for intensity beam shaping and phase adjustment/correction similarly to the described above. Accordingly also the system calibration is also similar to that described above and that will be further described below. In the present example of FIG. 3D the beam shaping system is configured to operate on the first Bragg order of diffraction (also known as off axis order 1). As a result of the system's operation in the first Bragg order the phase corrector optical module 304 is laterally offset with respect to the position of the intensity redistribution module 303. Offset of the phase corrector optical module 304 configured in accordance with the deflection of the first Bragg diffraction order which is obtained during the interaction of the beam with the diffractive redistribution module 303.

The diffraction efficiency of each of the diffractive optical modules 303 and 304 (which are in this example configured to operate with the first Bragg diffraction order) is about 90%. Accordingly, the overall efficiency obtained by the beam shaping system 301 when configured to operate on the first Bragg diffraction order is about 75%. In some refractive implementations of such beam shaping system, efficiency of about 95% may be obtained.

Figure 3E:
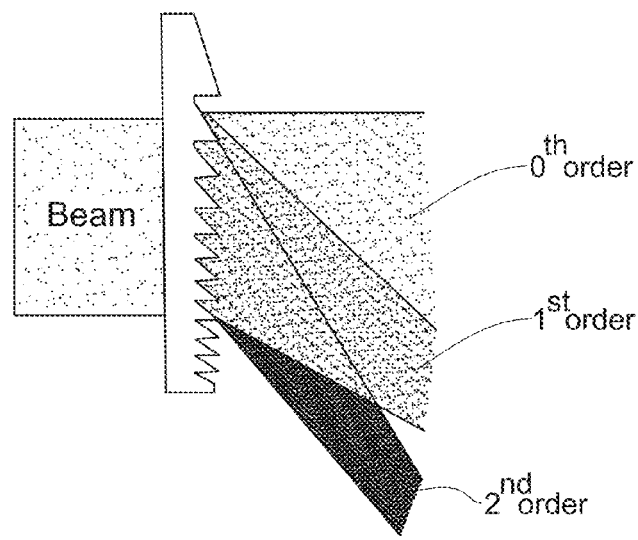
Figure 3F:
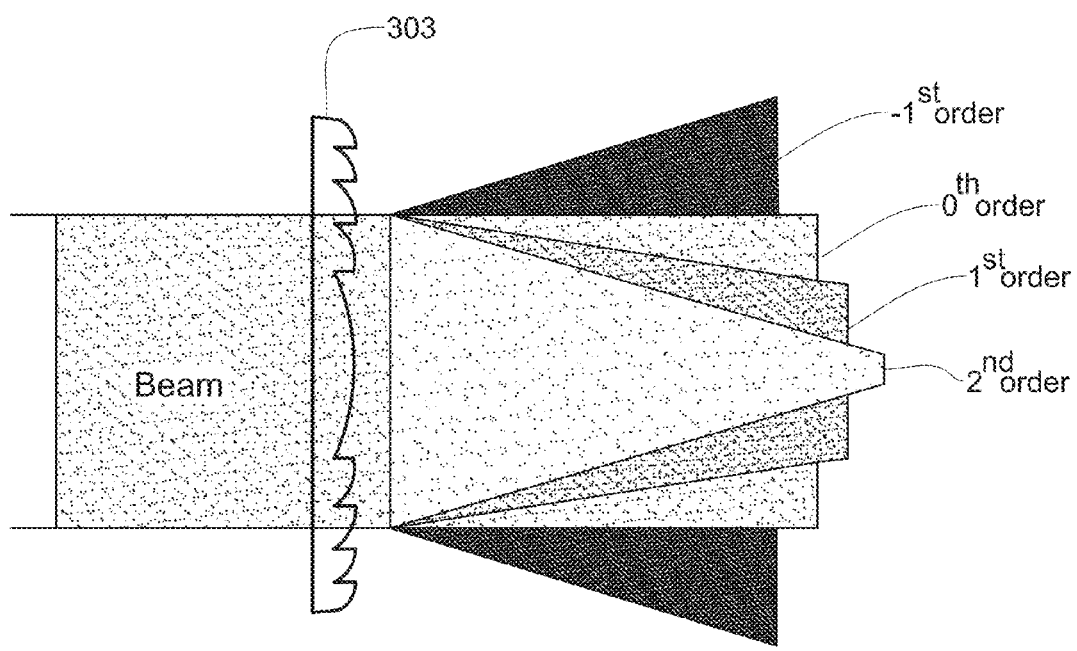

It should be understood that the system 301 of the present invention may also be implemented with the optical modules 303 and 304 being configured to operate at other Bragg diffraction orders. Specifically, FIG. 3E is a schematic illustration of the diffractive intensity redistribution module 303 which is used in the embodiments of FIG. 3D and configured to apply proper intensity beam shaping to the first (off-axis) Bragg diffraction order. FIG. 3F is a schematic illustration of a diffractive intensity redistribution module 303 which is used according to some embodiments of the present invention in which beam shaping is applied to the on-axis diffraction order. Specifically, this diffractive intensity redistribution module 303 is configured to apply proper intensity beam shaping to the zeros (on-axis) Bragg diffraction order.

As noted above, the properties of the output light beam $B_E$ may generally be sensitive to the position as well as the orientation of the optical modules 303 and 304. Accordingly, apparatus 300 may optionally be configured for calibrating the both the position/alignment and the orientation of the optical modules 303 and 304. However, in certain embodiments, the intensity distribution and the wave-front of the output light beam $B_E$ may be specifically sensitive to a lateral alignment of the optical modules 303 and 304 with respect to one or two lateral directions that are substantially orthogonal with respect to the optical path OX while being less sensitive to other properties of the position and orientation of the optical modules. Accordingly in such embodiments, the apparatus 300 may be configured for calibrating the alignment of the optical modules 303 and 304 only with respect to those one or two lateral directions.

It should also be noted that optical beam shaping system 301 of FIG. 3A may be configured and operable for one or two dimensional beam shaping. Namely, the system 301 may be adapted to affect the intensity distribution and wave-front of the light beam with respect to only one lateral direction, or it may affect the two dimensional intensity distribution and wave-front of the light beam (i.e. with respect to two lateral directions perpendicular to the optical path of the beam). To this end, in the first case (one-dimensional beam shaping), the optical modules 303 and 304 and possibly also 302 may include and utilize cylindrical optical elements for affecting the intensity distribution of the beam with respect to only one lateral direction. Also alignment of such cylindrical optical elements may be required with respect to a single lateral direction. Accordingly, mini-stages 303A and 304A may be adapted for lateral alignment only with respect to that one lateral direction. In the latter case (two-dimensional beam shaping), lateral alignment may be required in two lateral directions with respect to the optical path OX. Accordingly, mini-stages 303A and 304A may be configured for two dimensional lateral alignments. It should be noted that in various embodiments where system 301 is configured to affect the two dimensional intensity distribution and wave-front of the light beam, the system may be configured for affecting a different or a similar beam shaping with respect to the two lateral directions. Accordingly, the optical modules 303 and 304 may include/utilize cylindrical and/or the radially symmetric optical elements.

Figure 4:
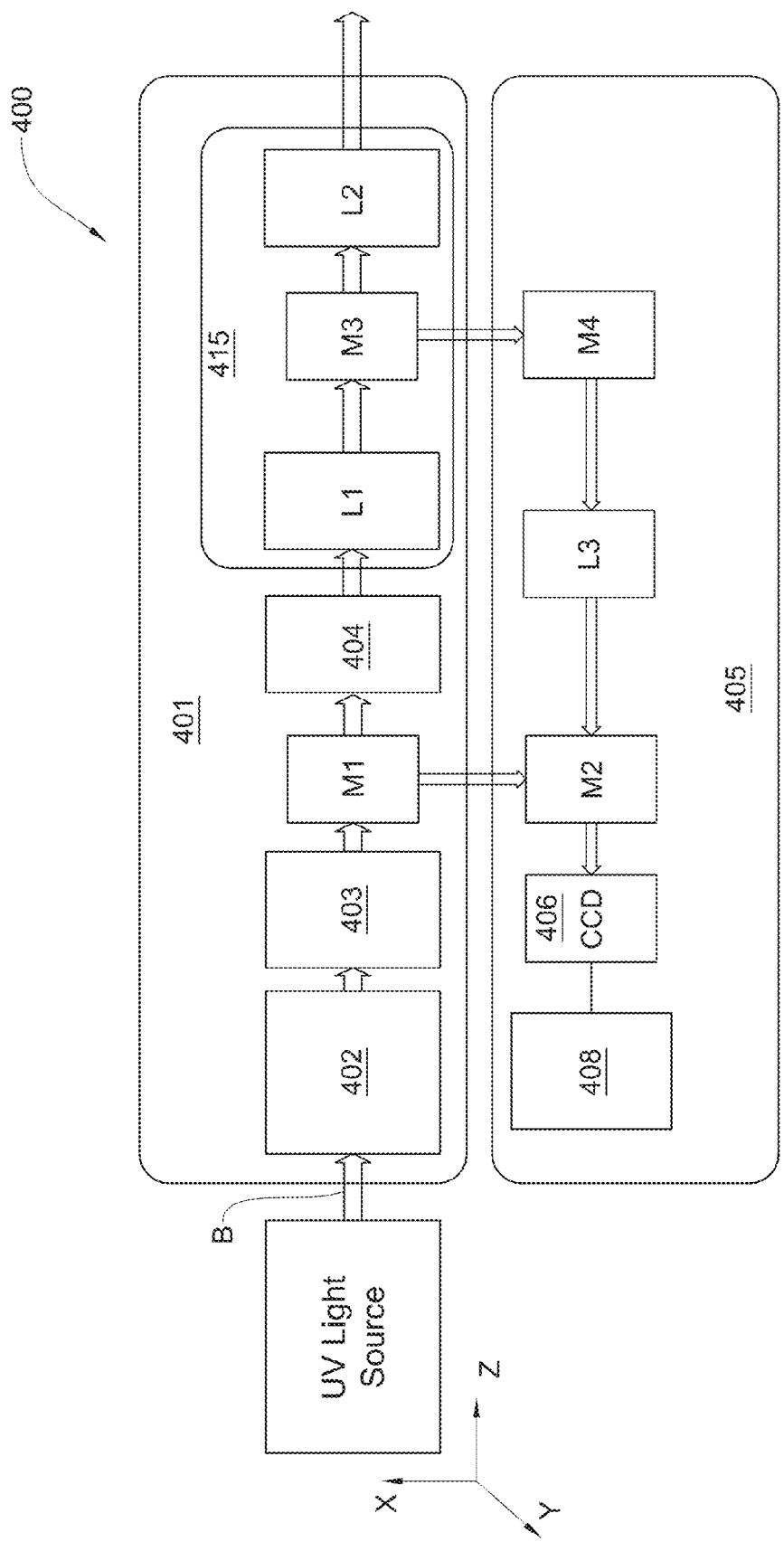
FIG. 4 is a block diagram schematically illustrating a beam shaping apparatus 400 of the present invention which is configured and operable shaping a planar input light beam with Gaussian intensity distribution to form a planar output beam having top-hat intensity profile in one lateral axis and Gaussian intensity profile in a second lateral axis.

Reference is now made to FIG. 4 showing a block diagram of illustrating schematically a beam shaping apparatus/system 400 according to an embodiment of the present invention. System 400 is configured and operable for receiving an input light beam having a planar wave-front and radially symmetric Gaussian intensity distribution and producing therefrom an output beam having a planar wave-front and a top-hat intensity distribution/profile along a first lateral direction (X) and Gaussian intensity profile along a second lateral direction (Y) perpendicular to the first lateral direction. Beam shaping system 400 is also configured to provide an un-isotropic magnification to the beam providing a first magnification ratio with respect to the first lateral direction and a second magnification ratio with respect to the second lateral direction (e.g. in some cases the there is no magnification with respect to the second lateral direction—the second magnification ratio being unity).

Beam shaping system 400 includes optical beam shaping system/module 401 and a calibration system/module 405. The beam shaping module 401 includes an adjustable spherical beam expander 402 (e.g. with isotropic magnification), an un-isotropic (e.g. one dimensional) intensity redistribution optical element(s) 403, a corresponding one dimensional phase correction optical element(s) 404 and a one dimensional beam expansion assembly 415. The optical elements 402, 403, 404 and the beam expansion assembly 415 are arranged, in that order sequentially, being spaced apart, along an optical path through the beam shaping module 401 (e.g. along the light propagation path of the light beam B). The beam shaping module 401 also includes two alignment modules (e.g. mini-stages; not shown in the figure) which are coupled respectively to the one dimensional intensity redistribution optical element 403 and phase correction optical element 404 and configured to allow their lateral alignment with respect to the optical path OX. The calibration module includes a controller 408 and a CCD imager 406 connectable to the controller for providing image data thereto, and light routing optical elements including mirrors M1 to M4, lenses L1 and L3 and suitable actuators which are configured for controllable optical engagement with the optical path OX at different sections thereof.

In the present example the intensity redistribution optical element 403 is configured and operable to map a Gaussian intensity profile of the incoming light (in a certain lateral axis X) to form a flat intensity profile (with respect to that lateral axis) at a specific distance from the position optical element 403. The phase correction optical element 404 is configured to reconstruct/rebuild a plane wave wave-font of the light beam while being positioned at the plane where the first element was designed to create the flat intensity profile. The intensity redistribution and phase correction optical elements, 403 and 404, may be implemented as aspheric cylindrical lenses. Thus, a light beam entering the beam shaper 401 having a Gaussian intensity profile in a certain lateral direction is formed, by the beam shaper 401, to have, in that lateral direction, a top-hat intensity profile while neither its wave-front nor its intensity profile in the second lateral direction are substantially affected at the output from phase correction optical element 404. The one dimensional beam expansion assembly 415 may also include cylindrical lenses (e.g., lens L2) that are configured for magnification to the light beam with respect to the first lateral direction while not affecting magnification with respect to the second lateral direction.

The light routing optical elements including the mirrors (e.g. periscope mirrors) M1, M2, M3 & M4 and the lenses L1 & L3 are arranged to form routing assemblies adapted for selectively directing light from different sections of the optical path OX to the imager 406 to enable optical calibration and alignment of the optical modules 402, 403 and 404 in a manner similar to that described above with respect to FIG. 3A. Additionally, in the present example the intensity redistribution optical module 403 is movably mounted for retraction from the optical path to allow directing light from the beam expander 402 to the imager 406 without that light interacting with the optical module 403. The arrangement of these routing optical elements would be described in greater details below with respect to the description of FIGS. 5A to 5G.

Turing now to FIGS. 5A to 5H, there is illustrated a method for calibrating a beam shaping system according to an embodiment of the present invention. Specifically, beam shaping system such as that (401) of FIG. 4 may require to operate with tight tolerance on the width of the incoming Gaussian beam as well as on the relative lateral distance between optical axis of the beam (Gaussian center) and the optical axis of the optical elements 403 and 404. For example, an acceptable tolerance on the width of the incoming beam may be about 1.5% and the optical elements 403 and 404 should be laterally aligned within an error smaller than 5 µm and 15 µm respectively.

Figure 5A:
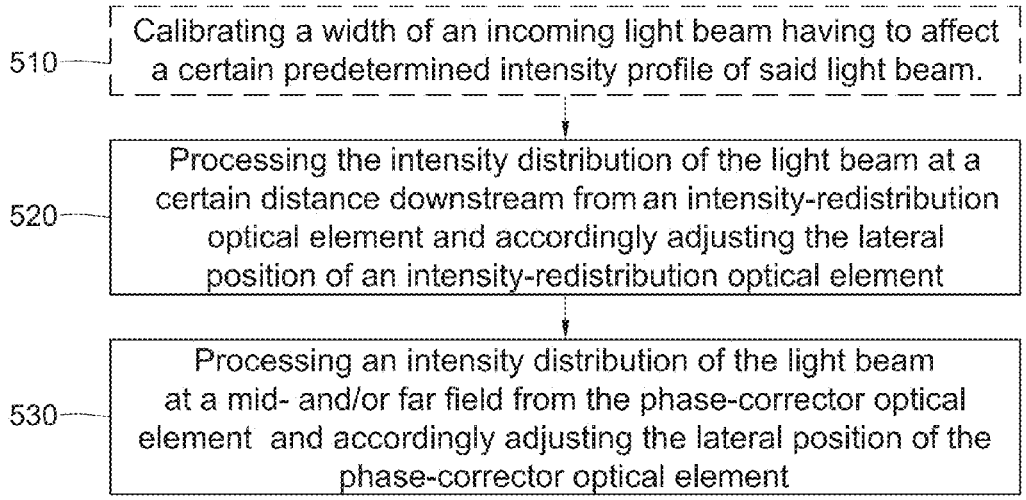
FIG. 5A is a flow chart 500 of a calibration method, according to the present invention, for use in calibration of the optical beam shaping systems of the invention.

In FIG. 5A a flow chart 500 is provided to illustrate an example of a calibration method of the present invention, for calibrating the optical beam shaping systems of the invention (e.g. 401 of FIG. 4). The method 500 is an example of the operation of step 240 of method 200 described above. The method 500 includes three calibration steps 510, 520 and 530 which are carried out sequentially (in an orderly fashion). Step 510 is an optional step in which the width of the incoming light beam is adjusted. Step 520 is carried out to calibrate the intensity distribution of the output beam by adjusting the alignment between the incoming light beam and the intensity distribution optical module (e.g. lens 403 of FIG. 4). Step 530 is carried out thereafter to calibrate the wave front of the output beam by aligning the phase corrector module (e.g. lens 404 of FIG. 4) with respect to the light beam at the position at which a desired intensity distribution of the light beam is obtained. In the following, these steps are described in detail and their operation is exemplified with reference to system 400 of FIG. 4.

To this end, the calibration method 500 provides for separately and sequentially calibrating degrees of freedom (DOF) which are associated with different optical elements/modules of the optical beam shaping system of the present invention (e.g. separating DOF matrix of the optical system). Specifically, each DOF associated with different optical module is independently and sequentially calibrated by an independent calibration step being one of the steps 510, 520 and 530. The calibration method 500 is a sequential combination of these independent steps.

Figure 5B:
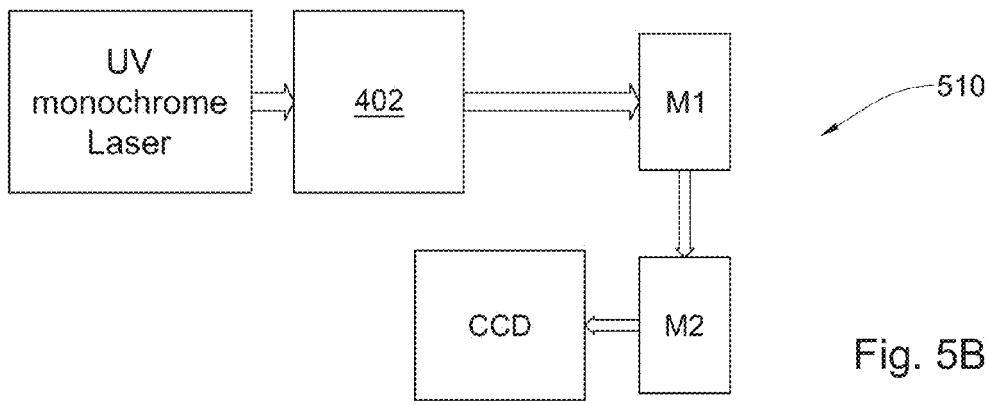

In particular, in optional step 510 calibration of incident beam size (e.g. laterals widths/radii) is first performed. According to some embodiments of the present invention this is carried out by the following:

i. Directing the incident the optical beam (incoming beam $B_C$ or a portion thereof $B_{CP}$) straight towards the imager 406 (e.g. directing/deflecting the beam to propagated along an optical path to the imager and/or moving the beam shaping optical module 403 away from such optical path). This is illustrated in FIG. 5B where the optical path between the beam expander 402 and the imager is formed by proper positioning of retro mirrors M1 and M2.

ii. Calibrating the width and/or collimation of the incoming beam $B_C$ (calibrating the zoom and/or collimation of the beam expander 402). The image of the beam is grabbed from the imager 406 and an intensity profile of the light beam (e.g. one dimensional intensity profile along the X lateral axis) is determined. The beam width may then be determined for example by utilizing Gaussian approximation. Then new magnification values to adjust the zoom state of the beam expander may thereafter be obtained based on the beam width, for example utilizing a look-up table (LUT indicating expanders zoom vs. beam expander state) or a formula relating the measured beam width to the desired magnification and/or by a feedback based on further processing of images from the imager 406. Particularly, in cases where the incoming beam has a Gaussian intensity profile, the width of the Gaussian beam may be extracted by fitting the intensity profile of beam's image acquired by imager 406 with a Gaussian profile of the form: $G(x) = A \cdot e^{-2(x/\omega)^2}$ where A is the beams intensity at the Gaussian center, ω is the Gaussian half width and x is the coordinate along the X axis. By fitting the intensity profile of beam's image with such Gaussian function, the width ω of the beam can be estimated.

After calibration of the size of the incident beam BC, calibration of the intensity-redistribution optical module 403 is performed in step 520, for example by carrying out the following:

i. The intensity-redistribution optical module 403 is introduced into the optical path of the beam $B_C$ between the beam expander 402 and the imager 406 (e.g. by moving optical module 403 into the optical path) to form the intermediate beam $B_M$ (or a portion thereof $B_{MP}$) propagating to the imager 406.

ii. Acquiring an image of the intermediate beam $B_M$ from the imager 406. Particularly in cases where the beam shaping system 400 is configured a Gaussian to Flat beam shaper, a 'Top-Hat' image of the intermediate beam $B_M$ is obtained.

iii. Evaluating symmetry/flatness parameter of the thus obtained Top Hat image (e.g. determining asymmetry parameter of the Top-Hat image). The evaluated parameter (e.g. asymmetry parameter) being indicative of the misalignment of the redistribution optical module 403. Particularly, in cases where beam shaping is sought with respect to the X lateral axis (e.g. one dimensional beam shaping), flatness of the Top-Hat intensity profile along the X axis may be determined as follows:

a. Determining a portion/slice of the image that is representative of the intensity profile of the beam with respect to the lateral axis of interest (X axis). Considering, for example, a Gaussian intensity profile of the image along the Y lateral axis (e.g. perpendicular to X) and fitting it into a Gaussian to extract its peak coordinate. A slice of the Top-hat image is cropped/taken around the center of the Gaussian intensity profile with respect to the Y lateral axis as calculated. This image slice may be further averaged with respect to the Y axis to obtain the average intensity profile of the beam in with respect to the X axis (X intensity profile).

b. Determining a region of interest (ROI) in the thus obtained X intensity profile. This is aimed at determining the width/boundaries of the Top-hat in the X intensity profile (e.g. determine the full width at half maximum FWHM of the intensity profile). For example, the average/raw data of the cropped slice may be fitted with a super-Lorentzian of the form $$L(x) = A \cdot \frac{1}{\left(1 + \left(\frac{x}{\omega}\right)^{40}\right)}$$

where here A is a scale factor of the Lorentzian x is the coordinate along the X axis and ω is a width of the fitted Lorenzian. The width ω of the fitted Lorenzian corresponds to the width of ROI.

c. Determining an asymmetry parameter corresponding to the linearity/flatness of the Top-hat shaped intensity profile within the ROI. For example, a parameter/score indicative of the linear slope of the intensity profile in the ROI is calculated.

iv. Scanning/shifting the intensity-redistribution optical module 403 while in each scan position repeating substeps ii and iii to determine the symmetry/flatness of the obtained image/intensity-profile of the beam. At each repetition the intensity-redistribution optical module 403 is slightly shifted along the lateral X axis (e.g. scanning/shifting the intensity-redistribution optical module 403 along X with scanning step pitch of about 10 µm over a travel range of about 0.5 mm). At each scan position, asymmetry parameter/score (e.g. the linear slope of that Top hat image) is determined in sub-step iii. The asymmetry parameter is indicative of the misalignment of the redistribution optical module 403 and thus the scanning the position of the intensity-redistribution optical module 403 while determining values of the asymmetry parameter at different positions provides for determining an aligned position of the intensity-redistribution optical module 403. For example FIG. 5D, which is further described below, shows three images of the light beam taken in three different lateral X positions of the intensity-redistribution optical module 403 and three corresponding graphs illustrating the X intensity profile of the beam as extracted from those images.

v. Then, the intensity-redistribution optical module 403 is laterally aligned with respect to the X axis by adjusting its lateral X position to the position resulting with the most symmetrical X intensity profile from all the scanned positions of optical module 403; e.g. to the position in which the X intensity profile is most flat/having and/or has the minimal absolute slope.

It should be noted that in cases where two dimensional beam shaping is sought with respect to both the X and Y lateral axes, sub-steps (i) to (v) above may be carried out twice, once for each axis.

Finally, after intensity-redistribution optical module 403 is calibrated, calibration of the phase corrector optical module 404 is performed in step 530, for example by carrying out the following:

i. The phase corrector optical module 404 is introduced into the optical path of the beam $B_M$ to form the output beam $B_E$ (or a portion thereof $B_{EP}$) propagating to the imager 406. Specifically, the optical path to the imager may be configured such that the imager is in located in the Mid/Far field with respect to the phase corrector optical module 404. For example, by utilizing suitable lenses in the optical path as illustrated for example in FIG. 2F and described below.

ii. Acquiring an image of the output beam $B_E$ from the imager 406. Particularly in cases where the beam shaping system 400 is configured a Gaussian to Flat beam shaper and the imager is located in the Mid field with respect to the phase corrector 404, a top-hat image/intensity profile of the output beam $B_E$ is obtained. In cases where the imager is located in the Far field with respect to the phase corrector 404 (e.g. taken at the focal plane of lens L1), a 'Sinc' image of the output beam $B_E$ is obtained.

iii. Evaluating the asymmetry of the image obtained in sub step ii. The asymmetry of the image (e.g. the evaluated value of the asymmetry parameter) being data indicative of the misalignment of the phase corrector 404. In cases of one dimensional beam shaping with respect to the X lateral axis, the asymmetry may be evaluated as follows (in two dimensional beam shaping cases the asymmetry may be evaluated using the similar principles for each of the two lateral axes):

a. Determining/selecting a portion/slice of the image that is representative of the intensity profile of the beam with respect to the lateral axis of interest (X axis). Considering a Gaussian intensity profile of the image along the Y lateral axis (e.g. perpendicular to X) and fitting it into a Gaussian to extract its peak coordinate. A slice of the Top-hat image is cropped/taken around the center of the Gaussian intensity profile with respect to the Y lateral axis as calculated. The slice may be further averaged with respect to the Y axis to obtain the average intensity profile of the beam in with respect to the X axis (X intensity profile).

b. Determining a region of interest (ROI) in the thus obtained X intensity profile. The average/raw data of the cropped slice is fitted with a corresponding matching function. Specifically, in case the imager is located in the Mid field with respect to the phase corrector 304 the X intensity profile is expected to have a Top-hat shape and accordingly it is fitted with a super-Lorentzian $$L(x) = A \cdot \frac{1}{\left(1 + \left(\frac{x}{\omega}\right)^{40}\right)}$$

in a manner similar to that described above in step 520 sub-step iii part b.

c. Alternatively, in case the imager is located in the Far-field with respect to the phase corrector 404, the X intensity profile is expected to have a Sinc shape and therefore it is fitted with the $$\text{Sinc}(x/\omega) = A \cdot \frac{\text{Sin}(x/\omega)}{x/\omega}$$

to determine the width ω of a region of interest (ROI) in the image. Determined the asymmetry (e.g. asymmetry parameter) of X intensity profile within the ROI. The value of such an asymmetry parameter may be calculated for example by multiplying the intensity profile within the ROI with a symmetry weighting function S(x) (anti-symmetric function), and integrating along the ROI to obtain a parameter/score indicative of the asymmetry parameter. According to some embodiments the symmetry weighting function is an asymmetric function of the form $S(x)=(x/\omega)^5$. The asymmetry parameter indicator yields small absolute value (i.e. near zero) for the nominal position of the phase corrector 404 and positive/negative for a positive/negative misalignment of the phase corrector 404 along the X axis with respect to the optical path OX. The asymmetry of the intensity profile may alternatively or additionally be determined by measuring the auto-correlation of the output image obtained in the mid- and/or far-fields.

iv. Scanning/shifting the phase corrector optical module 403 while in each scan position repeating sub-steps ii and iii to determine the symmetry/asymmetry of the obtained image/intensity-profile of the beam. At each scan the corrector optical module 404 is slightly shifted along the lateral X axis (e.g. with scanning step pitch of about 20 µm). At each scan position, step iii above is repeated to determine the symmetry of the obtained X intensity profile (mid field Top-hat image or far-field Sinc image). The value of the asymmetry parameter determined in this stage is indicative of the misalignment of the optical phase corrector 404. Therefore by scanning the position of the phase corrector 404 while determining the values of the asymmetry parameter at different positions, an aligned position of the phase corrector 404 is determined. FIG. 5G, which is further described below, exemplifies two X intensity profiles (in this case Top-hat profiles) of the light beam as obtained via the above described processing of mid-field images of the beam which were taken in two lateral X positions of the phase corrector optical module 404. FIG. 5H, which is also described below, showing three graphs illustrating the X intensity profile (Sinc profiles) of the beam as extracted from the focal plane of lens L1 of module 415. Those images as obtained via the above described processing of three far-field images of the beam captured in three respective lateral X positions of the phase corrector optical module 404.

Then, the phase corrector optical module 404 is laterally aligned by adjusting its lateral X position to the X position resulting with the most symmetrical X intensity profile.

The operation of system 400 of FIG. 4 during each of the method steps 510, 520 and 530 is further described in the following with reference to FIGS. 5B, 5C and 5F respectively. FIG. 5B illustrates the operation of step 510 in system 400. In this step, the calibration controller 408 engages routing assembly with the light outputted from the beam expander 402. The controller 408 operates to retract the intensity redistribution module/lens 403 from the optical path of the light beam and mirror M1 is introduced in the optical path and arranged for directing the light beam outputted from the beam expander 402 to propagate through mirror M2 to the imager (CCD) 406. It is noted that Mirrors M1 and M2 together with the retraction mechanisms (not shown) associated with the intensity redistribution module/lens 403 and mirror M1 serve as parts of a first routing assembly (e.g. 302R of FIG. 3A) directing the beam from the beam expander 402 to the calibration module 405.

During step 510 the intensity distribution image of the beam outputted from the beam expander 402 is captured by the CCD 406. The calibration controller 408 is responsive to image data from the CCD 406 and utilizes that image data for controlling the magnification/zoom of the beam expander 402 for adjusting the width of the light beam while maintaining the beam collimated at the output of the beam expander 402. The calibration controller may process the image of the light beam (in the manner noted above) to determine the width of the light beam as compared with a desired width of the light beam and accordingly determines the proper operational instructions needed to actuate and/or adjust the beam expander such that a light beam, with a desired predetermined width is obtained at its output light port.

Figure 5C:
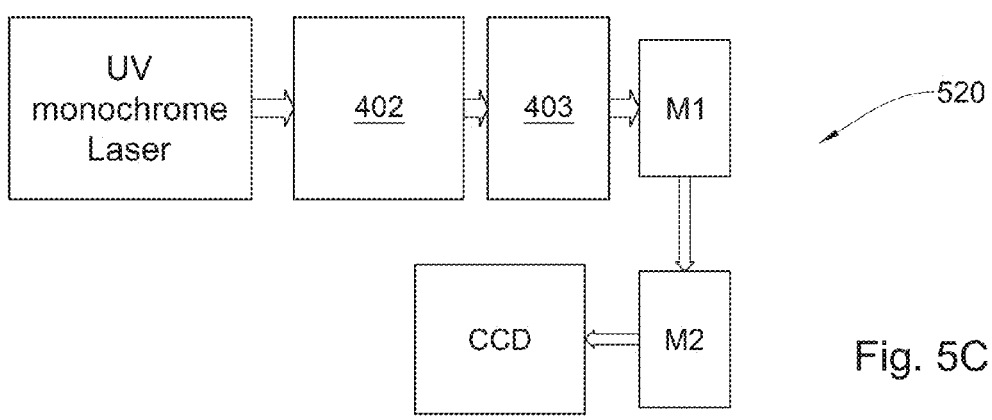

FIG. 5C illustrates the operation of step 520 in which the calibration system 405 is operated to align a lateral position of the intensity redistribution module 403 system 400. Here, an image of the intensity distribution of the beam which is obtained by the intensity redistribution module 403 is captured by the CCD 406. Preferably in some embodiments, the CCD sensor 406 and the phase corrector optical module 404 are in equi-distance in respect to intensity redistribution module 403 such that the desirably flat intensity profile (top-hated profile in one lateral direction) of the light beam outputted from the intensity redistribution module 403 is imaged.

In step 520, the calibration controller 408 operates to introduce intensity redistribution module/lens 403 as well as mirror M1 to the optical path of the light beam. Mirror M1 is arranged for directing the light beam, after its interaction with lens 403, to propagate through mirror M2 to the imager (CCD) 406. Thus here, mirrors M1 and M2 together with the retraction mechanisms (not shown) of the lens 403 and mirror M1 serve as parts of a second routing assembly (e.g. 303R of FIG. 3A). The positions of the CCD 406 and mirrors M1 and M2 are designed such that the optical length between the lens 403 and the CCD 406 substantially equal to the optical length between the lens 403 and phase corrector lens 404. This arrangement provides that the image captured by the CCD 406 is indicative of the intensity distribution of the light beam at the position of the phase corrector lens 404. The calibration controller 408 is responsive to image data received from the CCD 406 for controlling the alignment position of the intensity redistribution lens 403 with respect to the light beam and thereby adjusting the intensity distribution of the light beam at an optical surface in the vicinity of the phase corrector module 404.

Figure 5D:
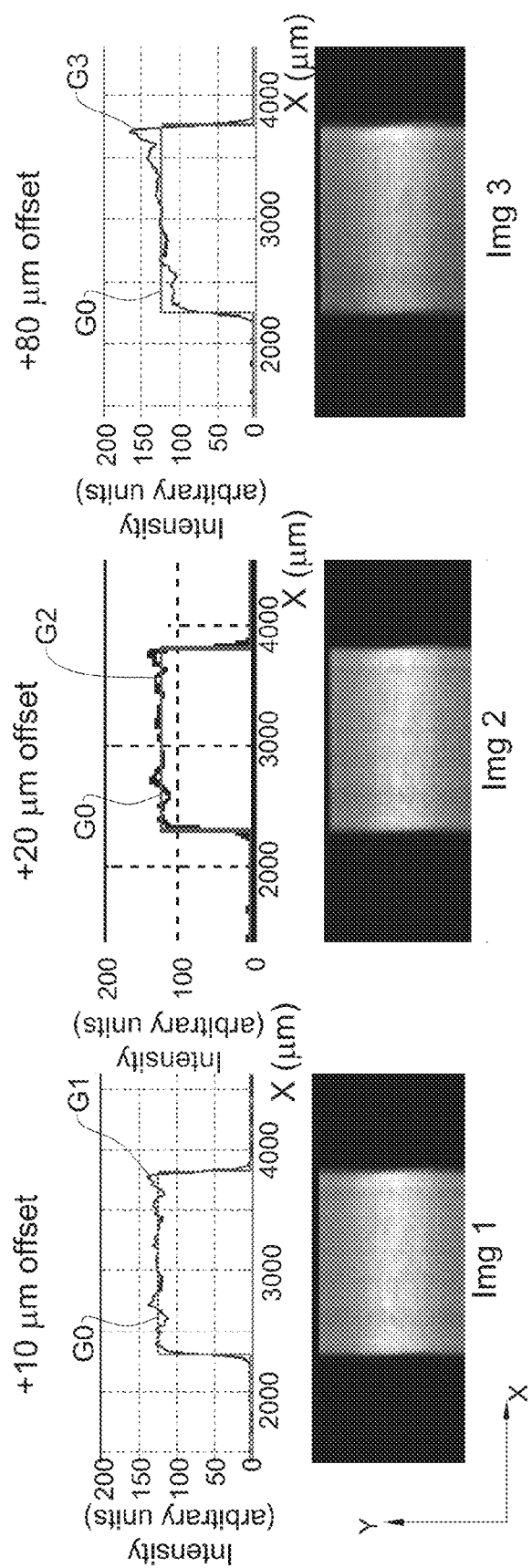

The operation of calibration controller 408 in connection with step 520 is described in more details in connection with FIG. 5D. FIG. 5D shows three images Img1, Img2 and Img3 indicative of the intensity distribution of the light beam in the vicinity of the phase corrector 404 as obtained for three different lateral alignments of the intensity redistribution lens 403. It is noted that when the center of the intensity redistribution module 403 is placed relatively close to the Gaussian center of the beam (e.g. within lateral alignment position of between ±50 μm) the energy distribution of the captured intensity profile becomes linear along the cross section at the CCD plane. This allows accurately determining and correcting a misalignment of the intensity redistribution module 403.

More specifically, image Img1 is obtained with a lateral offset of 10 microns displacement in the X lateral direction of the primary/longitudinal axis of the cylindrical intensity redistribution lens 403 from an aligned position with respect to the optical path OX. Namely the primary axis PX of the cylindrical intensity redistribution lens 403 is displaced, in the X lateral direction, by 10 microns from the aligned/centralized position with respect to the path of the light beam. Images Img2 and Img3 are obtained respectively with lateral offsets of 20 and 80 microns from an aligned position of the primary axis of the lens 403 with respect to the optical path OX. The intensity distribution in these images is shown to be substantially Gaussian with respect to one lateral direction (Y) and nearly top-hat distribution in a second lateral direction (X) of the beam.

Figure 5E:
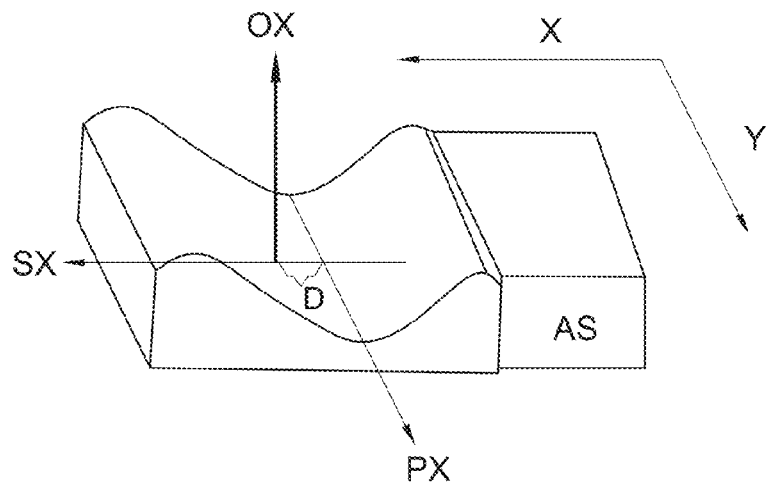

The primary and secondary axes PX and SX of a cylindrical lens CL, which may be configured as lens 403 and/or 404, are illustrated in FIG. 5E with respect to the optical path OX. In the beam shaping system 400, the cylindrical lens CL, operating as either lens 403 or 404, is generally oriented such that its primary and secondary axes PX and SX are parallel to the Y and X lateral directions respectively. The cylindrical lens CL is illustrated coupled to an alignment module AS. The alignment module AS may be for example a mini-stage coupled with an electric actuator such as motor or a Piezo-electric element. Misalignment of D microns between the primary axis PX of the cylindrical lens CL and the optical path OX is illustrated. This misalignment may be corrected by proper actuation of the alignment module AS for shifting the lens in the direction of its secondary axis SX.

Turning back to FIG. 5D, as can be seen from the images, as the lateral offset of the intensity redistribution lens 403 is increased, the intensity distributions become more asymmetric with respect to the lateral direction Y. To this end it is noted for UV and Deep UV light, the intensity distribution becomes substantially asymmetric even for small misalignment of the lens 404 in the order of few tens of microns.

As noted above, the calibration controller 408 processes the image obtained from the CCD 406 and determines a degree of asymmetry in the image with respect to at least one lateral direction (Y) which in this case corresponds the offset of lens 403 from the optical axis in the direction of the lens's secondary axis (namely the offset between the position of the lens's primary axis from the optical path). To this end calibration controller 408 may for example average the values of pixels of the CCD image in the Y lateral direction (e.g. average the pixels around the Gaussian peak) and thereby obtain data (e.g. graphs) representing the intensity profile of the beam in the X lateral direction. Graphs G1, G2, G3 of the lateral intensity profile of the beam corresponding to images Img1, Img2 and Img3 respectively are shown in the figure. A graphs G0 are also presented in the figure to indicate a desired top-hat intensity distribution of width of about 1.5 mm to be obtained after the beam shaping. From each of the graphs G1, G2, G3, data indicative of a degree of asymmetry may be computed by the calibration controller 408 as noted above. Specifically flatness values computed from graphs G1, G2 and G3 are about 6.84%, 7.13% and 11.79% respectively.

Figure 5F:
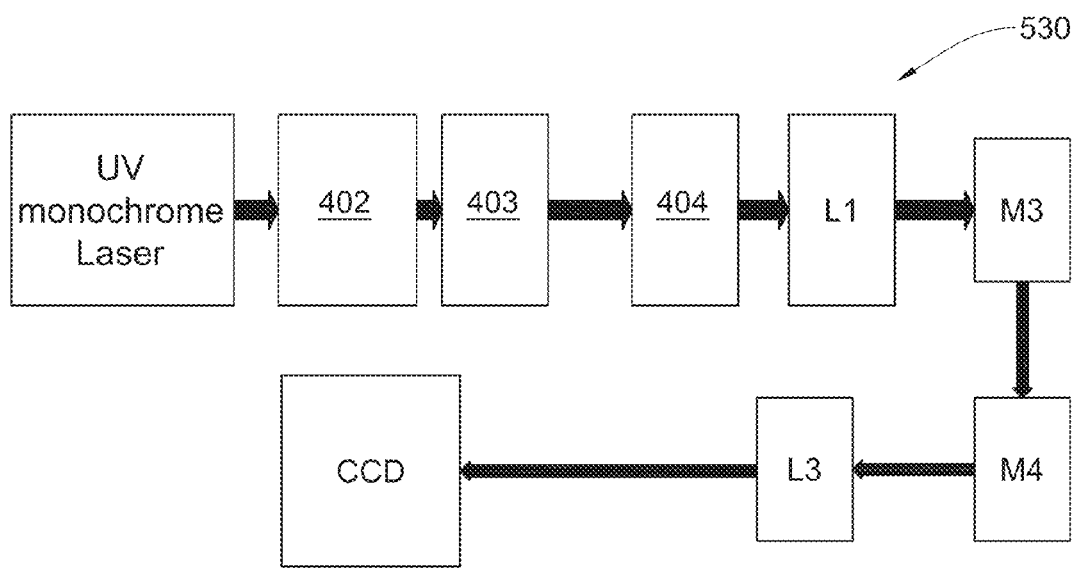

Turning now to FIG. 5F, the operation of step 530 is exemplified with reference to the system 400. In this step, the calibration controller 408 operates to introduce retractable mirror M3 to the optical path of the light beam after the light beam's interaction with the intensity redistribution and phase correction lenses/modules 403 and 404. A retraction mechanism of the mirror M3 is not specifically shown in the figure. The position of mirrors M3 and M4 are arranged such that the light beam is directed to propagate to the imager/CCD 406 while interacting along its path with one or more optical modules (e.g., lenses L1 and L3) that are configured to affect the light propagation such that a mid- and/or far-field image of the light beam is captured by the imager 406. Here, lens L3 is introduced in the optical path to the imager. Lens L3 is designed such that the beam propagates in free space to the imager 406 (namely propagating through a uniform medium without interacting with optical/mechanical components), while the imager 406 is in the mid/far field regime with respect to phase correction lenses/modules 404. Accordingly in the captured image (referred to above as second image data), wave front errors introduced by misalignment of the phase correction lenses/modules 404 are emphasized in the imaged beam profile (e.g. top-hat profile). Here, mirrors M3 and M4 together with the retraction mechanisms (not shown) of the mirror M3 and the lenses L1 and L3 serve as parts of a third optical routing assembly (e.g. 304R of FIG. 3A) adapted for mid/far field imaging of the light beam after its wave-front is affected by the phase corrector module 404.

In the present example the two lenses L1 and L2 are arranged in the optical path of the light to cause mid-field imaging of the light beam. Lens L1 also serves as a part of a one dimensional beam expander module 415 which is, in this case, configured for further expanding the top-hat lateral intensity distribution of the output light beam. Being part of the 1-D beam expander assembly 415, lens L1 is placed such that the Phase corrector is at it's the back focal plane. Lens L3 is placed along the optical path between the lens L1 and the imager such that a near field image of a top hat beam would fall on the imager 406. The lens was designed such that top had diffraction would be developed mainly on the top-hat edges so asymmetry would be emphasized to thereby enable misalignment of the light beam exiting the phase corrector module 404.

Having a mid/far field image of the light beam captured by the CCD 406, the calibration controller 408 is configured to receive the image data and control the alignment position of the phase corrector module/lens 404 with respect to the optical path thereby adjusting wave-front of the light beam. According to some embodiments of the invention, the calibration controller 408 processes the image obtained from the CCD 406 and determines an intensity distribution/profile of the beam (e.g. of the lateral cross-section thereof in the mid/far field regime). Then, misalignment data/parameter-value is determined by identifying asymmetry in the intensity distribution/profile with respect to at least one lateral direction (Y) in the beam's cross-section. Such asymmetry may correspond to a lateral offset between of the lens's 404 primary axis and the optical path OX. As noted above, the calibration controller 408 may for example average the values of pixels of the CCD image in the Y lateral direction to obtain data (e.g. graph data) representing the intensity profile, in the X lateral direction, of the far/mid field image of the beam.

The inventors have found that for mid-field imaging, the asymmetry in the edges of the top hat intensity distribution, which is imaged by the CCD, is extremely sensitive to misalignment of the phase corrector module. Specifically, when a light beam having a top hat intensity profile is propagating freely, its energy distribution is converted from a perfect or almost perfect top-hat at the very near field to Sinc (i.e. $\operatorname{Sinc}(\alpha) = \operatorname{Sin}(\alpha)/\alpha$) at the far field. At a nominal mid field position, two symmetrical 'horns' are developed at the edges of the top hat profile. In case the phase corrector module 404 is not perfectly aligned (while the intensity redistribution module 403 is aligned), an asymmetry of the horns appears.

Graphs MG1 and MG2 showing the lateral intensity profile along the X direction of to respective images captured for aligned and misaligned positions of the phase corrector module 404 are shown in FIG. 5G. As can be seen from these graphs, for an aligned position of the phase corrector module 404, a symmetric intensity profile is obtained (graph MG1) in the mid-field image of the light beam. However, substantial asymmetry is developed in the intensity profile even for small misalignments of few microns. For instance, a misalignment of 20 microns affects development of the substantially uneven edges ('horns') of the graph MG2. The ratio between the intensity at the two edges of the intensity distribution graphs is changed from 1:1 in an aligned position of the phase corrector module (graph MG1) to 3:5 in 20 microns de-center/misaligned position thereof (graph MG2).

It is noted that the central region (between the edges/'horns') of intensity distribution graphs, MG1 and MG2, may also carry marginal information regarding the optimal position of the phase corrector module. However, in some embodiments of the present invention it is desired to suppress the effects of the central region of the intensity distribution in order to allow obtaining good measure of the asymmetry in the graphs. Suppressing the effects of the central region is of the intensity distribution graphs is achieved, according to some embodiments, by multiplying the ROI in the intensity profile graph by a weighting function which has higher value near the edges of the intensity profile. For example of a function that meets these requirement is a $5^{th}$ order polynomial (i.e. $S(x)=x^5$) in which the origin point is lies at the center of the profile.

FIG. 5G exemplifies a preferred embodiment of the present invention, according to which the calibration of the phase corrector module 404 is based on the intensity profiled obtained in the mid field with respect to the phase corrector module 404 (e.g. wherein a diffraction limited spot is obtained at the focal plan of the phase corrector module 404). However, as noted above, the lateral position of the phase corrector module 404 may also be calibrated based on feedback data indicative of the intensity pattern/profile of the beam at the far-field with respect to the optical module 404.

Calibrating the alignment of the phase corrector module 404 may be achieved also by imaging the light beam at the far-field with respect to the optical module 404. FIG. 5H, showing three graphs FG1 to FG3 representing the X direction intensity profile of the a far-field images of the light beam for three lateral positions of the phase corrector module 404 at which it was respectively laterally misaligned by +50 microns, 0 microns (substantially aligned) and −50 microns. FIG. 5H was obtained by placing the imager along an optical path at the front focal plane of the lens L1 to obtain the far-field imaging (this can be obtained also by utilizing routing optics to relay an image of the focal plane to the imager and integrating them in lateral direction to obtain the intensity profile of the beam corresponding to the orthogonal lateral direction). As can be seen from this figure, for perfect alignment of the module 404 (graph FG2), the far field intensity profile yields an almost perfect Sinc. However, small misalignments of even few microns (up to few tens of microns) cause development of substantial asymmetry in the captured intensity profile of the far-field image. Such asymmetry is presented by non-symmetric/un-even side-lobs appearing in the intensity profiles shown in the graphs FG1 and FG3. Graphs SG1 to SG3, which are presented in the figure, show the approximated Sinc functions closest to the measured intensity profiles FG1 to FG3 respectively. The widths of those approximated Sinc functions are also indicated in the figure.

Thus in step 530 the calibration controller 408 may be configured for processing an image of the light beam captured in the mid- and/or far-fields with respect to the phase corrector module and analyzed that image to determine operative alignment instruction for actuating/aligning the phase corrector lens 404.

It should be noted that correct operation of step 520, is typically sensitive to the width of the light beam and thus step 520 is carried out after operation of the optional step 510 at which the beam width is calibrated. In cases in which the incoming light beam is of predetermined width, within a certain tolerance threshold, the operation of step 510 may be obviated. Also, correct operation of step 530 depends on an accurate alignment of the intensity redistribution lens 403, accordingly, step 530 is carried out only after step 520 was employed for aligning lens 403.

Also, in the present example, lateral alignment of the optical modules 403 and 404 with respect to only one lateral direction was exemplified. However, in various embodiments of the invention, the same principles may be employed for aligning the optical modules with respect to additional directions as well (e.g. with respect to two lateral directions orthogonal to the direction of light propagation). Additionally or alternatively, the principles of the invention may be used for obtaining proper orientations of the optical modules with respect to the optical path. The technique of the invention may be adapted for obtain position and orientation calibration of the optical modules with respect to up to six degrees of freedom.

Figure 6:
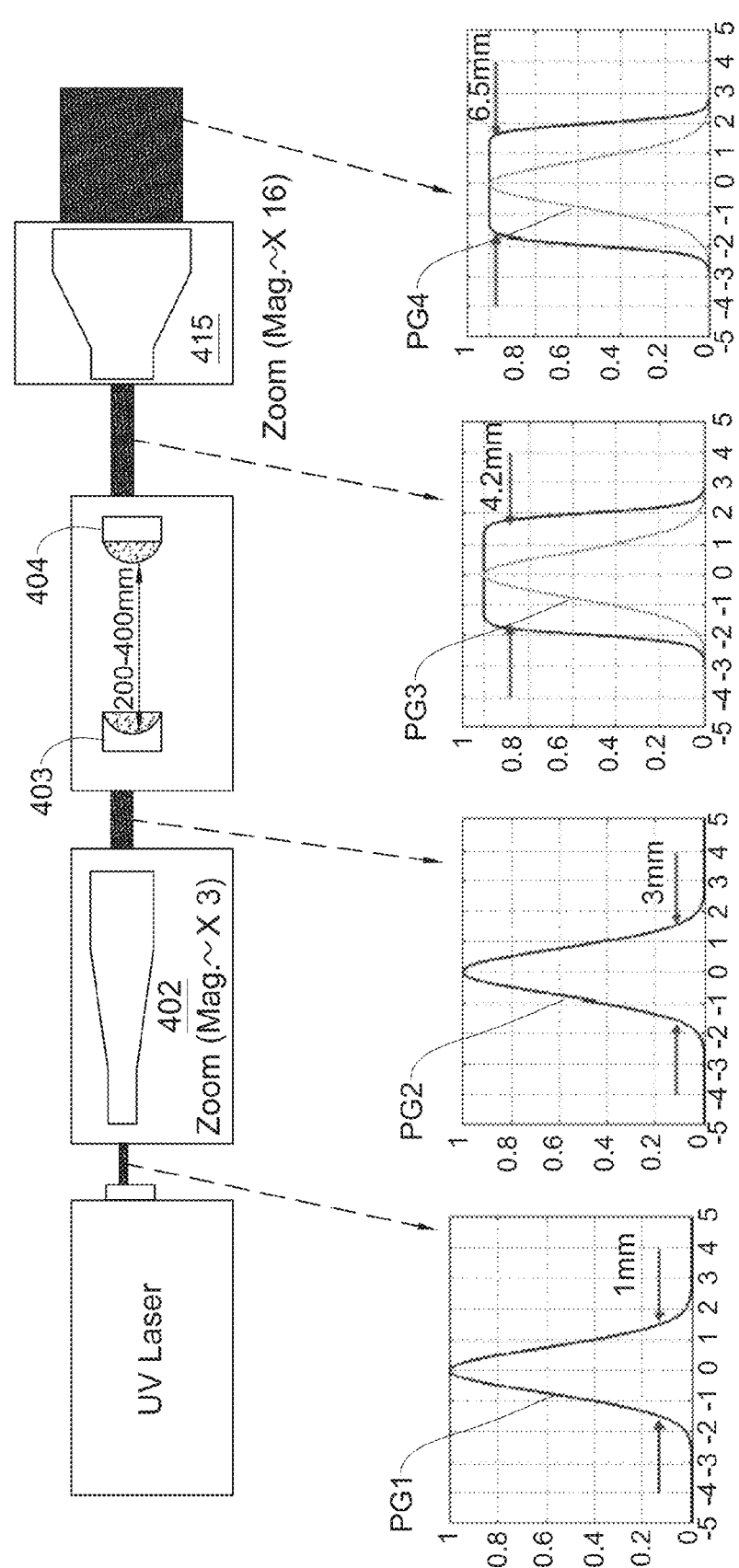
FIG. 6 illustrates schematically the operation of system 400 of FIG. 4 after calibration method 500 of FIG. 5A was employed.

Reference is made to FIG. 6 illustrating schematically, in a self explanatory manner, the operation of the system 400 after calibration method illustrated in the flow chart 500 was employed as described above with reference to FIGS. 5A to 5H. The intensity profile of the light beam along the X lateral direction is illustrated by the profile graphs PG1 to PG4. As shown, a deep-UV laser beam is introduced to the isotropic beam expander 402 Gaussian intensity distribution with width of about 1 mm. The beam expander 402 applies ×3 magnification to the beam resulting with a 3 mm wide Gaussian beam. After interaction with the aligned intensity-distribution and phase-correction optical modules, 403 and 404, the laser beam acquires a top-hat intensity profile in the lateral X direction with width of 4.2 mm. The intensity profile in the Y lateral direction remains substantially unaffected (namely Gaussian). The laser beam then traverses the one-dimensional beam expander assembly 415 which is adapted to apply additional magnification (~×16) to the light beam with respect to the X direction thus resulting with 65 mm wide top-hat deep-UV light beam.

It is noted that slight spatial fluctuation in intensity profile of the light outputted from a intensity and phase beam shaping module of the present invention (e.g. from modules 301/401 of FIGS. 3A and 4 respectively) might be smoothed by utilizing an intensity smoothing optical module. According to some embodiments of the invention, the beam shaping systems of any one of FIGS. 3A, 4 and 5 may also include an intensity smoothing module which is not specifically illustrated in those figures. Such an intensity smoothing module may for example include one or more traveling lens (TL) modulators located downstream from beam shaping optical modules (e.g. after modules 303/403 and 304/404 of FIGS. 3A and 4 respectively). The intensity smoothing module may be adapted for smoothing the intensity of the light beam with respect to one or more lateral directions.

Figure 7:
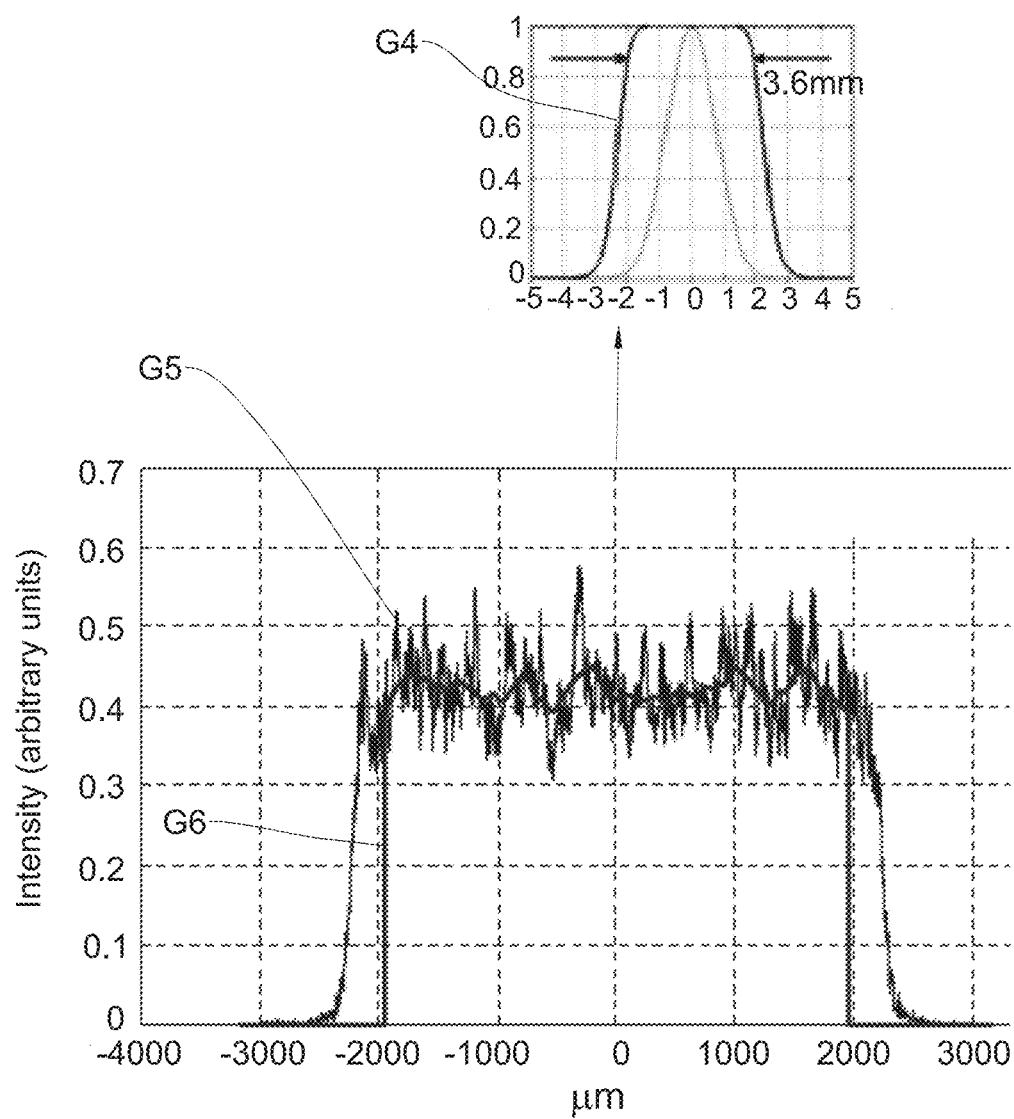
FIG. 7 illustrates the operation of a beam smoothing module that is included in the optical beam shaping system of FIG. 6.

Reference is made to FIG. 7 illustrating the operation of a beam smoothing module that is included in system 400 of FIG. 6. The beam smoothing module may be located along the optical path of the laser beam after the one dimensional beam expander 415. In this example the beam smoothing module is based on a one dimension traveling lens module which includes a crystal that is modulated by acoustic waves to form traveling lenses propagating within the crystal in the X lateral direction (corresponding to the lateral X direction of the beam shaping system as described above). The traveling lenses refract light rays of the light beam emanating from the beam shaping module 401 thereby smoothing fluctuations in the intensity profile of the light beam in the X lateral direction. Specifically, the traveling lens uses ~1/11 of the line width performed by the beam shaper and the continuation optics. It runs (scan) over the whole profile. Each traveling lens position creates a spot on what is creating a scan line. Therefore the traveling lens actually performs a convolution action resulting with smoothing of the beam.

Graph G4 is shown in FIG. 7 to illustrate the top-hat intensity profile of the light beam after it has been shaped by the beam shaping module 401. This graph is generally similar to the graph PG3 of FIG. 6. Intensity fluctuations in the top-hat intensity profile 113 are shown in more details in graph G5 of FIG. 7. Graph G6 illustrates the top-hat intensity profile of the light beam after it was smoothed by a traveling lens beam smoothing module.

The invention claimed is:

1. A method calibrating a beam shaping module including a first and a second optical modules sequentially interacting with a light beam; the method comprising carrying out the following steps:
   i. measuring a first intensity distribution of said light beam after its interaction with said first optical module, at a certain optical distance downstream from said first optical module, and utilizing said first intensity distribution to determine a lateral misalignment of said first optical module, thereby enabling calibration of a lateral position of the first optical module; and
   ii. when said first optical module is in said lateral aligned position, measuring a second intensity distribution of said light beam at a certain location downstream from said second optical module, and utilizing said second intensity distribution to determine a lateral misalignment of said second optical module, thereby enabling calibration of a lateral position of the second optical module.

2. The method of claim 1 wherein said light beam is a coherent light beam, and said calibration provides for shaping a predetermined incoming lateral intensity distribution of the coherent light beam to form an output light beam having a different lateral intensity distribution.

3. The method of claim 1 wherein said first optical module is an intensity-redistribution optical module configured and operable for interacting with the light beam having a certain predetermined incoming intensity distribution and affecting its propagation such that a certain desired intensity distribution of the light beam is formed at said certain distance downstream from the first optical module.

4. The method of claim 1 wherein said measuring of the first intensity distribution comprises imaging the light beam at said certain optical distance downstream from its interaction with said first optical module to capture a first image data indicative of said first intensity distribution.

5. The method of claim 1 wherein said certain optical distance substantially equals to an optical distance between the first and the second optical modules.

6. The method of claim 1 wherein determining the lateral misalignment of said first optical module comprises processing the first intensity distribution of the light beam after its interaction with the first optical module to determine an asymmetry parameter of said first intensity distribution, whereby said asymmetry parameter is indicative of the lateral misalignment of the first optical module.

7. The method of claim 6 comprising utilizing said asymmetry parameter of said first intensity distribution to estimate said lateral misalignment of the first optical module.

8. The method of claim 1 comprising utilizing the determined lateral misalignment of the first optical module for generating first operative alignment instructions for actuating said first optical module towards a laterally aligned position thereof.

9. The method of claim 1 wherein said second optical module is a phase-corrector optical module located at about said certain distance downstream from the first optical module and configured and operable for interacting with said light beam having a certain predetermined wave-front to affect phases of light rays of said light beam such that certain desired wave-front of said light beam is formed.

10. The method of claim 1 wherein said measuring of the second intensity distribution comprises imaging the light beam after its interaction with the first and second optical modules, at said certain location downstream from the second optical module, and thereby capturing a second image data indicative of the second intensity distribution.

11. The method of claim 1 wherein said certain location is in a mid/far field regime with respect to said second optical module.

12. The method of claim 11 wherein said mid/far field regime corresponds to a Fresnel's regime at which wave front errors in the light beam exiting said second optical module are converted into asymmetry of the intensity distribution of the light beam.

13. The method of claim 1 wherein determining the lateral misalignment of said second optical module comprises processing the second intensity distribution to determine an asymmetry parameter of said second intensity distribution, whereby said asymmetry parameter is indicative of the lateral misalignment of the second optical module.

14. The method of claim 13 comprising utilizing said asymmetry parameter of said second intensity distribution to estimate said lateral misalignment of the second optical module.

15. The method of claim 1 comprising utilizing said determined lateral misalignment of the second optical module and generating second operative alignment instructions for actuating said second optical module towards a laterally aligned position thereof.

16. The method of claim 1 wherein said beam shaping module comprises a beam expander and wherein the method comprising measuring a width of the light beam and calibrating a magnification ratio of said beam expander for obtaining an output light beam having a desired width.

17. A calibration system for calibrating a beam shaping module comprising a first and second optical modules accommodated along an optical path of light propagating through the beam shaping module; the calibration system comprises:
a first routing assembly adapted for selectively directing light beam from the optical path, for measuring a first intensity distribution of the light beam after its interaction with said first optical module, at a certain optical distance downstream from said first optical module;
a second routing assembly adapted for selectively directing light beam from the optical path, for measuring a second intensity distribution of the light beam after its interaction with said second optical module at a certain location downstream from said second optical module; and
a calibration controller adapted to process said first intensity distribution to determine a lateral misalignment of said first optical module, and to process said second intensity distribution to determine a lateral misalignment of said second optical module; thereby enabling calibration of the beam shaping module.

18. The system of claim 17 wherein said first optical routing assembly is adapted for directing the light beam to be captured by an imager at said certain optical distance down stream from the first optical module for generating a first image data indicative of said first intensity distribution; and wherein said first optical routing assembly is configured such that said certain optical distance substantially equals to an optical distance between the first and the second optical modules thereby providing that asymmetry of the first intensity distribution is indicative of said lateral misalignment of the first optical module.

19. The system of claim 17 wherein said second optical routing assembly is adapted for directing the light beam to be captured by an imager at said certain location downstream from the second optical module for generating a second image data indicative of said second intensity distribution; and wherein said second optical routing assembly is configured such that said certain location is in a mid/far field regime with respect to said second optical module thereby providing that wave front errors in the light beam exiting said second optical module are converted into asymmetry of the second intensity distribution of the light beam at said certain location; said asymmetry being thereby indicative of said lateral misalignment of the second optical module.

20. The system of claim 17 wherein said calibration controller is configured and operable for determining an asymmetry parameter of said first intensity distribution and thereby estimating the lateral misalignment of said first optical module, and determining an asymmetry parameter of said second intensity distribution and thereby estimating the lateral misalignment of said second optical module.

\* \* \* \* \*